United States Patent
Berbee et al.

(10) Patent No.: US 10,494,460 B2
(45) Date of Patent: *Dec. 3, 2019

(54) PROCESS FOR PRODUCING ETHYLENE-BASED POLYMERS WITH LOW HEXANE EXTRACTABLES

(71) Applicant: Dow Global Technologies LLC, Midland, MI (US)

(72) Inventors: Otto J. Berbee, Terneuzen (NL); Cornelis F. J. Den Doelder, Terneuzen (NL); Stefan Hinrichs, Terneuzen (NL); Teresa P. Karjala, Freeport, TX (US); John O. Osby, Freeport, TX (US)

(73) Assignee: Dow Global Technologies LLC, Midland, MI (US)

(*) Notice: Subject to any disclaimer, the term of this patent is extended or adjusted under 35 U.S.C. 154(b) by 79 days.

This patent is subject to a terminal disclaimer.

(21) Appl. No.: 15/737,448

(22) PCT Filed: Jun. 23, 2016

(86) PCT No.: PCT/US2016/038933
§ 371 (c)(1),
(2) Date: Dec. 18, 2017

(87) PCT Pub. No.: WO2016/210075
PCT Pub. Date: Dec. 29, 2016

(65) Prior Publication Data
US 2018/0112017 A1   Apr. 26, 2018

Related U.S. Application Data

(60) Provisional application No. 62/184,344, filed on Jun. 25, 2015.

(51) Int. Cl.
*C08F 110/02* (2006.01)
*B01J 19/24* (2006.01)
(Continued)

(52) U.S. Cl.
CPC ......... *C08F 110/02* (2013.01); *B01J 19/2415* (2013.01); *C08F 2/001* (2013.01);
(Continued)

(58) Field of Classification Search
CPC  C08F 110/02; C08F 2/001; C08F 2/01; C08F 2/38; C08F 4/38; C08F 2500/08;
(Continued)

(56) References Cited

U.S. PATENT DOCUMENTS 3,334,081 A   8/1967   Madgwick et al.
3,654,253 A   4/1972   Steigerwald et al.
(Continued)

FOREIGN PATENT DOCUMENTS

DE   276598 A3   3/1990
WO   97/45465 A1   12/1997

OTHER PUBLICATIONS

Goto, Journal of Applied Polymer Science, Applied Polymer Symposium, vol. 36, Jan. 1, 1981, pp. 21-40.

*Primary Examiner* — Michael Bernshteyn
(74) *Attorney, Agent, or Firm* — Quarles & Brady LLP

(57) ABSTRACT

Ethylene-based polymers comprising the following properties: (A) a density from 0.9190 g/cc to 0.9240 g/cc; (B) a hexane extractable level that is less than or equal to the lower of: (1) (A+(B*density (g/cc))+(C*log(MI) dg/min)) based on total weight of the ethylene-based polymer; where A=250.5 wt %, B=−270 wt %/(g/cc), C=0.25 wt %/[log(dg/min)], or (2) 2.0 wt %; (C) a G' (at G"=500 Pa, 170° C.) that meets the following equation: G'≥D+E[log (12)], where D=150 Pa and E=−60 Pa/[log(dg/min)]; and (D) a melt
(Continued)

Flow Scheme for Inventive Examples 1 and 2 index (12) from 1.0 to 20 dg/min; are made in process comprising the step of contacting in a reaction configuration, comprising a first tubular reaction zone 1 and a last tubular reaction zone i, in which i is greater than or equal to (≥) 3, under high pressure polymerization conditions, and in which the first reaction zone 1 has a peak polymerization temperature greater than the peak temperature of the ith reaction zone, and wherein the difference in these two peak temperatures is ≥30° C.

9 Claims, 4 Drawing Sheets

(51) Int. Cl.
  C08F 2/00      (2006.01)
  C08F 2/01      (2006.01)
  C08F 2/38      (2006.01)
  C08F 4/38      (2006.01)
(52) U.S. Cl.
  CPC .................. *C08F 2/01* (2013.01); *C08F 2/38* (2013.01); *C08F 4/38* (2013.01); C08F 2400/02 (2013.01); C08F 2500/08 (2013.01); C08F 2500/12 (2013.01); Y02P 20/582 (2015.11)
(58) Field of Classification Search
  CPC .............. C08F 2500/12; C08F 2500/02; B01J 19/2415
  USPC ......................................................... 526/64
  See application file for complete search history.

(56) References Cited

U.S. PATENT DOCUMENTS

| | | |
|---|---|---|
| 3,917,577 A | 11/1975 | Trieschmann et al. |
| 4,916,255 A | 4/1990 | Kobayashi et al. |
| 5,539,075 A | 7/1996 | Gustafsson et al. |
| 6,569,962 B1 | 5/2003 | Zschoch et al. |
| 7,820,776 B2 | 10/2010 | Neuteboom et al. |
| 2002/0052455 A1 | 5/2002 | Hogt et al. |
| 2003/0114607 A1 | 6/2003 | Donck |
| 2004/0214971 A1 | 10/2004 | Gonioukh et al. |
| 2008/0242809 A1 | 10/2008 | Neuteboom et al. |
| 2009/0234082 A1 | 9/2009 | Neilen et al. |
| 2010/0060244 A1 | 3/2010 | Kurokawa et al. |
| 2011/0052525 A1 | 3/2011 | Grunewald et al. |
| 2012/0059469 A1 | 3/2012 | Myers et al. |
| 2013/0197168 A1 | 8/2013 | Berbee et al. |
| 2013/0237678 A1 | 9/2013 | Osby et al. |
| 2013/0295289 A1 | 11/2013 | Littmann et al. |
| 2013/0333832 A1 | 12/2013 | Vittorias et al. |
| 2014/0275427 A1 | 9/2014 | Nummila-Pakarinen et al. |
| 2014/0288257 A1 | 9/2014 | Zschoch et al. |
| 2014/0316094 A1 | 10/2014 | Berbee et al. |
| 2014/0316096 A1 | 10/2014 | Berbee et al. |
| 2015/0031843 A1 | 1/2015 | Hjertberg et al. |
| 2015/0038655 A1 | 2/2015 | Magnusson et al. |
| 2015/0073104 A1 | 3/2015 | Uematsu et al. |
| 2015/0111053 A1 | 4/2015 | Nummila-Pakarinen et al. |
| 2015/0133616 A1 | 5/2015 | Sultan et al. |
| 2015/0197590 A1 | 7/2015 | Osby |
| 2015/0210785 A1 | 7/2015 | Nummila-Pakarinen et al. |
| 2015/0274856 A1* | 10/2015 | Berbee .................. C08F 110/02 521/143 |
| 2015/0344599 A1 | 12/2015 | Osby et al. |
| 2016/0115256 A1 | 4/2016 | Berbee et al. |
| 2016/0137822 A1* | 5/2016 | den Doelder ....... C08L 23/0815 428/516 |
| 2017/0166668 A1 | 6/2017 | Duchateau et al. |

\* cited by examiner

Flow Scheme for Inventive Examples 1 and 2

Flow Scheme for Inventive Examples 3 and 4

Flow Scheme for Inventive Example 5

Flow Scheme for Inventive Example 6

Flow Scheme for Comparative Example 15

Flow Scheme for Comparative Examples 6, 10 to 13 and 16

Flow Scheme for Comp. Examples 7, 14 and 17 and Inv. Eamples 7 and 8

Flow Scheme for Comparative Examples 3 to 5, 8 and 9

PROCESS FOR PRODUCING ETHYLENE-BASED POLYMERS WITH LOW HEXANE EXTRACTABLES

REFERENCE TO RELATED APPLICATIONS

This application claims the benefit of U.S. Provisional Application No. 62/184,344, filed on Jun. 25, 2015, incorporated herein by reference.

BACKGROUND

Resins for extrusion coating on paper, board, aluminum, etc., are designed with broad molecular weight distribution and low extractables. In extrusion coating applications, the polymer is processed at high temperature conditions, typically above 280° C. and below 350° C. Broad molecular weight distribution (MWD) resins with a very high molecular weight fraction are used for good processability during coating (neck-in and drawdown balance). Low extractables are needed to reduce undesirable taste and odor, and to reduce smoke formation during the processing of the resin, especially when the resin is subjected to the high coating temperatures.

Typically LDPE (low density polyethylene) resins with broad MWD are made using autoclave reactors or a combination of autoclave and tube reactors. Broad MWD resins can be made by promoting long chain branching, and through the inherent residence time distribution, by which molecules will undergo shorter (low molecular weight) or longer (high molecular weight) growth paths.

Broad MWD autoclave resins for LDPE extrusion coatings are focused in two product density regimes, namely from 0.915 to 0.919 g/cc and from 0.919 to 0.924 g/cc. The invention in this document describes improved broad MWD tubular reactor products designed for the higher density regime from 0.919 to 0.924 g/cc.

The autoclave and tubular reactor systems differ in residence time distribution, which is more uniform for tubular reactors and dispersed for autoclave reactor zones. The uniform residence time leads to narrower MWD, and very broad MWD can only be achieved in tubular reactors by applying extremely differentiated polymerization conditions, for example, as described in WO 2013/078018, and/or application of a branching/cross-linking agent, for example, as described in U.S. Pat. No. 7,820,776. The use of extreme process conditions and/or branching/cross-linking agents can lead to high melt strength tubular low density polyethylene suitable for extrusion coating applications; however with elevated extractables. Undesirable gels in the polymer can result from the use of branching or cross-linking agents. Due to the difference in cooling capability, the conversion level ranges typically from less than (<) 20% (autoclave) to more than (>) 30% (tubular). This large difference in conversion level has a major impact on investment and operation costs as well on polymer output and power consumption (to compress ethylene) per unit of polymer.

U.S. Publication No. 2008/0242809 discloses a process for preparing an ethylene copolymer, where the polymerization takes place in a tubular reactor at a peak temperature between 290° C. and 350° C. The comonomer is a di- or higher functional (Meth)acrylate. WO 2012/057975 describes polymers comprising monomeric chain transfer agents (mCTAs). WO 2012/084787 describes simulated tubular reactions in which bi- and/or higher functional comonomers. EP 2 681 250 B1 describes a process of preparing an ethylene polymer using a free radical initiator and at least one chain transfer agent, wherein the concentration of the CTA in the first reaction zone is less than 70% of the concentration of the CTA in the reaction zone with the highest concentration of CTA. Other polymers and processes are disclosed in WO 2007/110127; WO 2014/003837; WO 2013/078018; WO 2013/078224; WO 2013/178241; WO 2013/178242; WO 2013/149698; WO 2013/132011 and WO 2013/083285.

For a multi- and/or bifunctional component to impact polymer rheology, it is important that (1) at least two functional groups of the component molecule react, and (2) effective branches are formed in the polymer. A "C=C" type of functional group (e.g., vinyl) will act as a comonomer, and incorporate into a polymer molecule. CTA functionality will either start the formation of a new polymer molecule, or initiate, after incorporation of the monomeric group, the formation of a LCB or T-branch. When the functional groups consist of monomeric groups, H-branches can be formed. H-branches are either intermolecular (between two molecules) or intramolecular (within a molecule), and formed by reaction of two or more "C=C" type groups of the bi- and/or multifunctional component. There is a need for polyethylenes made at density from 0.9190 g/cc with broad MWD, high G' value and at reduced extractable levels in a tubular reactor at high ethylene conversion levels. These needs have been met by the following invention.

SUMMARY OF THE INVENTION

In one embodiment, the invention is an ethylene-based polymer formed from a free-radical, high pressure polymerization process that includes a reactor configuration comprising, as reactors, only one or more tubular reactors, said polymer comprising the following properties: (A) a density from 0.9190 g/cc to 0.9240 g/cc; (B) a hexane extractable level that is less than or equal to the lower of: (1) (A+(B*density (g/cc))+(C*log(MI) dg/min)) based on total weight of the ethylene-based polymer; where A=250.5 wt %, B=−270 wt %/(g/cc), C=0.25 wt %/[log(dg/min)], or (2) 2.0 wt %; (C) a G' (at G"=500 Pa, 170° C.) that meets the following equation: G'≥D +E[log (I2)], where D=150 Pa and E=−60 Pa/[log(dg/min)]; and (D) a melt index (I2) from 1.0 to 20 dg/min. In one embodiment the invention is a process as described above, the process comprising contacting in a reaction configuration, comprising a first tubular reaction zone 1 and a last tubular reaction zone i, in which i is ≥3, under high pressure polymerization conditions, and in which the reaction zone 1 has a peak temperature>the peak temperature of reaction zone i, and wherein the difference in the two temperatures is ≥30° C.

DETAILED DESCRIPTION

Figure 1:
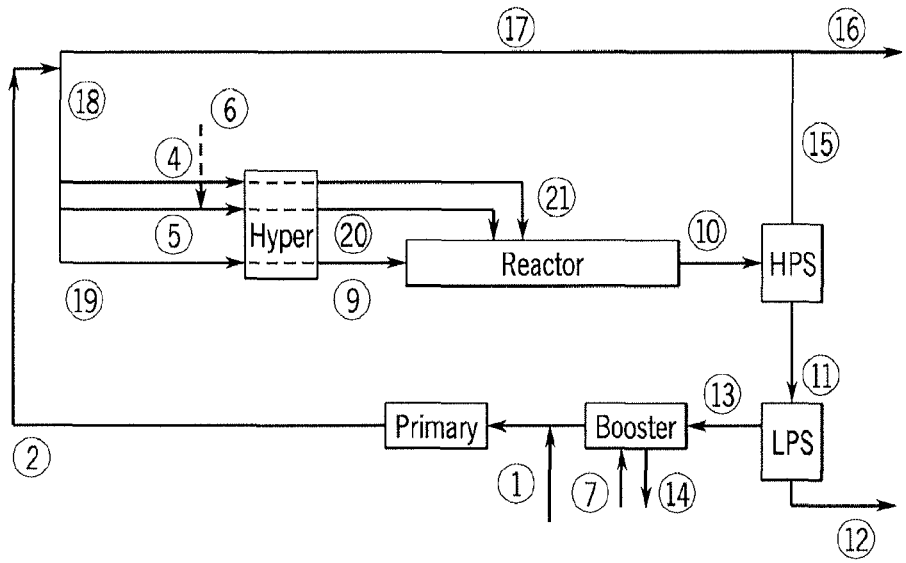
FIG. 1 is a flow diagram for Inv. Exs. 1 and 2.

Monomeric chain transfer agents are compounds which contain both a free radical polymerizable olefinic moiety and a moiety capable of chain transfer, connected by some form of linking group. These structures could contain multiple olefin or chain transfer moieties on a single compound. Some compounds can be described by the general formulas i) through vi):

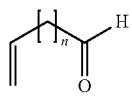
i)

where n=2 to 20;

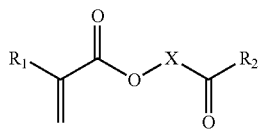
ii)

where R1 and R2 are independently H or Alkyl and where X is a C1 to C32 alkyl chain which is linear or branched;

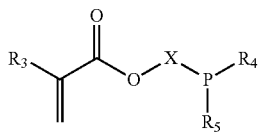
iii)

where R3, R4 and R5 are independently H or Alkyl and where X is a C3 to C20 alkyl chain which is linear or branched;

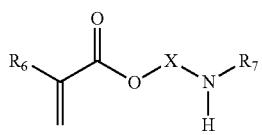
iv)

where R6 and R7 are independently H or Alkyl and where X is a C2 to C20 alkyl chain which is linear or branched;

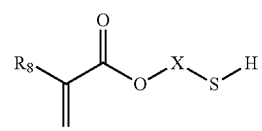
v)

where R8 is independently H or Alkyl and where X is a C2 to C20 alkyl chain which is linear or branched; and

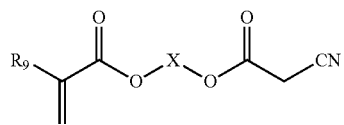
vi)

where R9 is independently H or Alkyl and where X is a C2 to C20 alkyl chain which is linear or branched.

The olefinic moiety is typically more reactive than ethylene in free radical polymerization and is preferably chosen from methacrylates, acrylates or allyl ethers. The chain transfer moiety is preferably defined as a group with a Cs value >0.01 (Table 1) and is preferably an aldehyde, ketone, mercaptan, phosphine, amine, or cyanoacetate. The functional groups of the bi- or multifunctional comonomer are usually separated by a spacer group, for example composed of units —CH2— —Si(CH3)2— —CH2— O— and/or —Si(CH3)2—O— and comprise a chain of from 1 to 32, preferably from 1 to 22 and most preferably from 1 to 12 atoms. The bi- or multifunctional comonomers (mCTAs) comprise one unsaturated group, which can be incorporated into the growing polymer chain, and another functional group, which can act as chain transfer agent in radical ethylene polymerization. Examples, see formula (I):

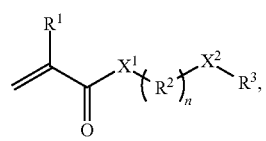
formula (I)

where the substituents and indices have the following meaning: $R^1$ is methyl or hydrogen, $X^1$ is —O— or —NH—, preferably —O—, $R^2$ can be identical or different and is —CH2—, —Si(CH3)2— —CH2—O— or —Si(CH3)2—O—, and preferably all $R^2$ are —CH2—; n is from 1 to 32, further from 1 to 22, and further from 1 to 12; $X^2$ is —C(O)—, —CHOH— or —CHSH—, preferably —C(O)—, $R^3$ is alkyl (e.g., methyl) or hydrogen and especially hydrogen; or the unit —$X^2$—$R^3$ stands for —CH═CH$_2$. Some specific structures a) through f) are as follows:

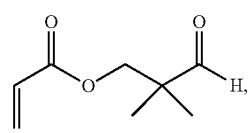
a)

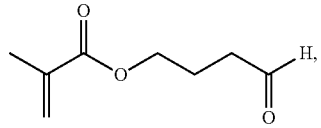
b)

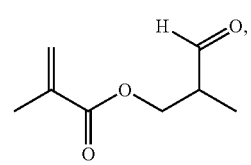
c)

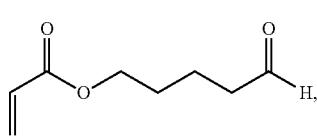
d)

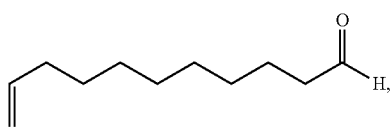
e)

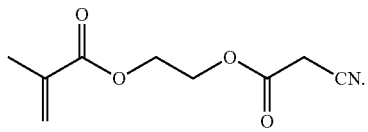

f)

Polyenes are compounds which contain multiple (≥2) free radical polymerizable olefinic moieties connected by some form of inert linking group. These compounds can be symmetric (all polymerizable olefin ends (each terminal C=C bond) the same) or asymmetric. For symmetrical polyenes, the chemical nature of each terminal C=C double bond is the same, for example, acrylate, methacrylate, vinyl, allyl, etc. Examples are shown in formulas vii) through xiv):

vii)

where t=2 to 20;

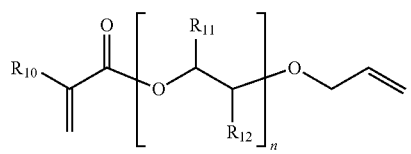

viii)

where R10, R11 and R12 are independently H or alkyl and where n is from 1 to 50;

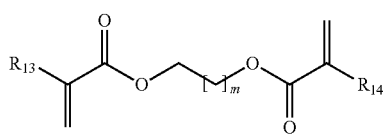

ix)

where R13 and R14 are independently H or alkyl and where m is from 1 to 50;

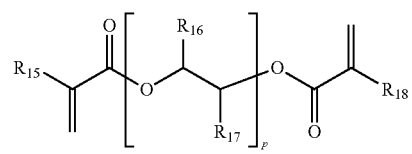

x)

where R15, R16, R17 and R18 are independently H or alkyl and where p is from 1 to 50;

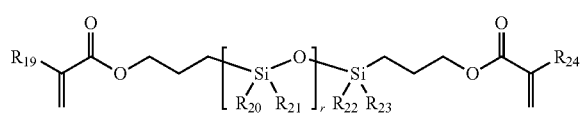

xi)

where R19, R20, R21, R22, R23 and R24 are independently H or alkyl and where r is from 1 to 1000;

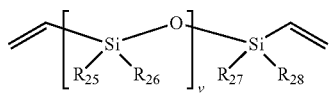

xii)

where R25, R26, R27 and R28 are independently H or alkyl and where v is from 1 to 1000;

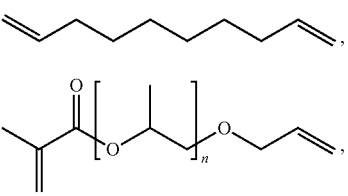

xiii)

where R29 is independently H or alkyl and w is from 1 to 20. Some specific structures g) through m) are as follows:

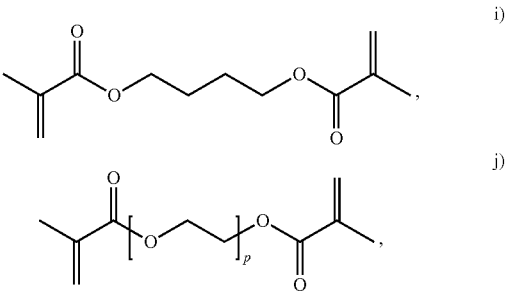

g)

h)

n = 1 to 50 i)

j)

p = 1 to 50 k)

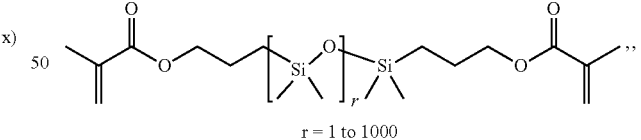

r = 1 to 1000 l)

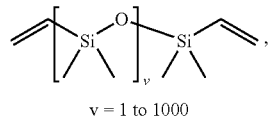

v = 1 to 1000 m)

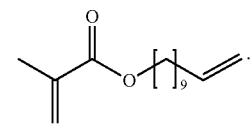

Typically a chain transfer agent is used in high pressure polymerization to regulate the molecular weight, by donating a hydrogen radical, by which an active radical at a growing polymer chain is terminated and a new active radical is formed at the remaining chain transfer agent molecule, which can build in monomer units. For a mCTA, the desired functionality of the chain transfer agent group is to initiate the formation of a T- or a Long Chain Branch (LCB) at an existing polymer molecule. Thus, it is important that the monomeric group has a high reactivity to ensure that preferably >90% of the mCTA is incorporated in the polymer structure. Once the mCTA is incorporated in the polymer structure, further reaction by the CTA functionality will lead to the formation of a T-branch. The unincorporated or free mCTA can still act as a classical CTA and start new molecules. It is important that the reactivity parameters r1 and r2, describing the reactivity of the monomeric group, are respectively ≤0.25 and ≥4.00.

The following figures show examples of T-branch and H-branch formation in the polymer through the application of respectively a mCTA and a polyene. In one embodiment, the ethylene-based polymer comprises at least one product structure (A and/or B):

T-branch formation through the application of a Monomeric CTA:

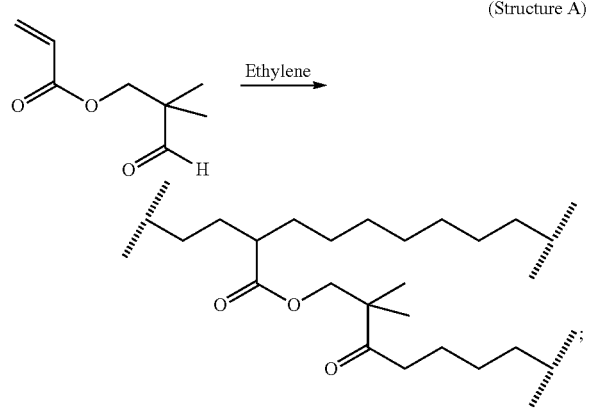
(Structure A)

or
H-branch formation through the application of a polyene:

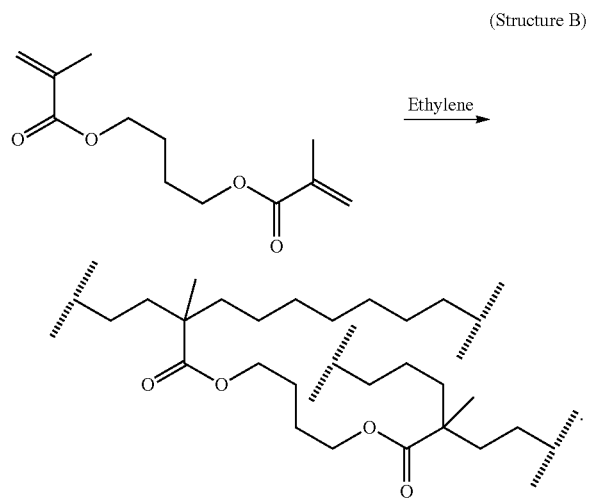
(Structure B)

In the above structures, the notation "//////" represents a break at the center of a covalent carbon-carbon bond in the hydrocarbon backbone of the ethylene-based polymer.

In one embodiment, the ethylene-based polymer is a modified low density polyethylene, comprising, in polymerized form, ethylene, and bonded chemical groups derived from a polyene. In a further embodiment, the modified LDPE comprises <2.0 wt %, further <1.0 wt %, of other comonomer(s), based on the weight of the modified LDPE. In one embodiment, the ethylene-based polymer comprises at least one structure as follows:

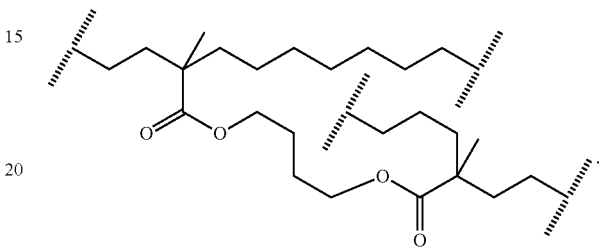

In one embodiment, the ethylene-based polymer comprises, in reacted form, ≥0.1, or ≥0.2, or ≥0.3, or ≥0.4 moles of "T-branches derived from the use of a mCTA" per 1000 moles of carbon atoms incorporated into the polymer, or per 500 moles of ethylene units incorporated into the polymer. In one embodiment, the ethylene-based polymer comprises, in reacted form, ≤3.0 moles, or ≤2.0 moles, or ≤1.5 moles, or ≤1.0 mole of "T-branches, derived from the use of a mCTA" per 1000 moles of carbon atoms incorporated into the polymer, or per 500 moles of ethylene units incorporated into the polymer. In one embodiment, the ethylene-based polymer comprises, in reacted form, ≥0.010, or ≥0.015, or ≥0.020, or ≥0.030, or ≥0.040, or ≥0.050 moles of "overall H-branches," derived from the use of polyenes, per 1000 moles of carbon atoms incorporated into the polymer, or per 500 moles of ethylene units incorporated into the polymer. In one embodiment, the ethylene-based polymer comprises, in reacted form, ≤3.0 moles, or ≤2.0 moles, or ≤1.5 moles, or ≤1.2 moles of "overall H-branches" per 1000 moles of carbon atoms incorporated, or per 500 moles of ethylene units incorporated into the polymer. In one embodiment, the ethylene-based polymer comprises, in reacted form, >0.1, or >0.2, or >0.3 moles of T-branches, derived from the use of a mCTA, per 1000 moles of carbon atoms incorporated, or per 500 moles of ethylene units incorporated into the polymer.

In one embodiment, the ethylene-based polymer has a melt index ($I_2$) from 1.0 to 20 g/10 minutes (min), or from 1.5 to 15 g/10 min, or from 2 to 12 g/10 min. In one embodiment the ethylene-based polymer has a density greater than or equal to 0.9190 grams per cubic centimeter (g/cc or g/cm$^3$). In one embodiment the ethylene-based polymer has a density ≤0.9240, or ≤0.9235, or ≤0.9230 g/cc. In one embodiment the ethylene-based polymer has a density from 0.9190 to 0.9240 g/cc, or from 0.9195 to 0.9235, or from 0.9200 to 0.9230, g/cc.

In one embodiment, the ethylene-based polymer has a hexane extractable level that is less than, or equal to, the lower of: (1) (A+(B*density (g/cc))+(C*log(MI) dg/min)) based on total weight of the ethylene-based polymer; A=250.5, or 250.4, or 250.3 wt %; B=−270 wt %/(g/cc), C=0.25 wt %/[log(dg/min)], or (2) 2.0 wt %. In one embodiment, the ethylene-based polymer has a G' (at G"=500 Pa, 170° C.) that meets the following equation: G'≥C+D[log (I2)], where C=150 Pa, or 155 Pa, or 160 Pa and D=−60 Pa/[log(dg/min)].

The invention also provides a composition comprising an inventive ethylene-based polymer as described herein. In one embodiment, the composition further comprises an ethylene/α-olefin interpolymer. In one embodiment, the composition further comprises another ethylene-based polymer that differs from the inventive ethylene-based polymer in one or more properties, for example, density, melt index ($I_2$), weight average molecular weight (Mw(conv)), number average molecular weight (Mn(conv)), and/or Mw(conv)/Mn(conv).

The invention also provides an article comprising at least one component formed from an inventive composition. In one embodiment, the article is a film or a coating, for example, an extrusion coating. In one embodiment, the article is a film. In another embodiment, the article is a coating. In one embodiment, the article is a coating for a cable or wire. In one embodiment, the article is a coated sheet, and in a further embodiment the sheet is selected from a metal, a paper, or another polymer substrate or combinations thereof. In a further embodiment, the coated sheet is used in a wire or cable configuration. In another embodiment, the coated sheet is used in a packaging application. In another embodiment, the coated sheet is used in a food packaging application, and further the coated sheet is used in a cook-in food packaging application. An inventive ethylene-based polymer may comprise a combination of two or more embodiments as described herein. An inventive composition may comprise a combination of two or more embodiments as described herein. An inventive article may comprise a combination of two or more embodiments as described herein.

Two different high pressure free-radical initiated polymerization reactor types are known. In the first type, an agitated autoclave vessel having one or more reaction zones is used. The autoclave reactor normally has several injection points for initiator and/or monomer feeds. In the second type, a jacketed tube having one or more reaction zones is used as a reactor. Suitable, but not limiting, reactor lengths may be from 100 to 3600 meters (m), or from 1000 to 2800 m. The process of this invention uses a reactor configuration in which the reactor(s) is (are) only tubular reactor(s), i.e., the reactor configuration does not include any autoclave reactors. In one embodiment, the reactor configuration comprises at least four reaction zones, and these zones can be located in one tubular reactor or spread over two or more tubular reactors. Typically, each tubular reactor comprises multiple reaction zones.

Often a CTA system is used to control molecular weight. A CTA system comprises one or more CTAs. CTAs typically comprise at least one of the following groups: alkane, aldehyde, ketone, alcohol, ether, ester, mercaptan or phosphine, and further an alkane, a ketone, an aldehyde, an alcohol or an ether. CTAs include, but are not limited to, isobutane, n-butane, methyl ethyl ketone, acetone, ethyl acetate, propionaldehyde, ISOPAR™-C, -E, and -H (ExxonMobil Chemical Co.), and isopropanol; and further propionaldehyde, butane and isobutane. The CTA is preferably not propylene or another alkene. In one embodiment, the amount of CTA used is from 0.01 to 10 weight percent based on the weight of the total reaction mixture. In one embodiment, the overall Cs value of the applied CTA systems is is ≤0.020 (e.g., propylene, acetone,), or ≤0.010 (i.e., cyclohexane), or ≤0.008 (e.g., isobutane, ethanol), or ≤0.006 (e.g., n-butane, ethylacetate), as measured by Mortimer et al., at 130° C. and 1360 atmospheres (137.8 Mpa).

In one embodiment the Z1/Zi ratio, wherein i≥3 and i is the last reaction zone, is ≤1.3, or ≤1.2, or ≤1.1. In one embodiment the Z1/Zi ratio, wherein i ≥3 and i is the last reaction zone, is ≥0.1, or ≥0.2, or less than or equal to 0.3. In one embodiment Z1/Zi is ≤(0.8−0.2*log (Cs)), wherein Cs is in the range of 0.0001 and 10. In one embodiment Z1/Zi is ≤(0.75−0.2*log (Cs)), wherein Cs is in the range of 0.0001 and 10. In one embodiment Z1/Zi is ≤(0.7−0.2*log (Cs)), wherein Cs is in the range of 0.0001 and 10. In one embodiment the CTA system does not comprise a mCTA.

In one embodiment, the process includes a high pressure and low pressure recycle loop to improve ethylene efficiency, since ethylene is only partially converted or consumed per reactor pass. Typically, the conversion level per reactor pass is from 20% to 40%. In one embodiment, the polymerization may take place in a tubular reactor as described WO2013/059042, which discloses a multi-zone reactor and alternate locations of feeding ethylene to control the ethylene to CTA ratio and therefore polymer properties. Ethylene may be simultaneously added in multiple locations to achieve the desired ethylene to CTA ratio. In a similar way, addition of CTA addition points may be carefully selected to control polymer properties as described WO2013/078018. CTA may be simultaneously added in multiple locations to achieve the desired CTA to ethylene ratio. In one embodiment, chain transfer agent is added to the first or second or first and second reaction zones. Likewise, by the use of additional polyene (branching agent), the addition points and the amount of the polyene (branching agent), as described in this application, may be controlled to control gel formation while maximizing the desired property of increased G' and performance in targeted applications. In one embodiment, polyene may be simultaneously added in multiple locations to achieve the desired polyene to ethylene ratio (for example, a molar ratio).

In one embodiment, the polymerization takes place in at least one tubular reactor. In one embodiment, the polymerization takes place in two reactors. In one embodiment, the polymerization takes place in one reactor with multiple or at least two reaction zones. In one embodiment, the polymerization takes place in a reactor configuration comprising at least four reaction zones, reaction zone 1 and reaction zone i (i≥3) and wherein reaction zone i is downstream from reaction zone 1. In one embodiment, i is from 3-5, or from 3-4. In one embodiment, i=3. In one embodiment, the total number of reaction zones =i. In a further embodiment, i is from 3 to 20, further from 3 to 10, and further from 3 to 6. In a further embodiment, i is from 3 to 20, further from 3 to 10, and further from 3 to 6.

In one embodiment by use of a polyene in combination with a chain transfer agent, more polyene, by mass, is added to reaction zone i as compared to the amount of polyene, by mass, added to reaction zone 1. As used above, the amount of polyene is determined based on the polyene added to a reaction zone in a feed (i.e., not carry-over polyene) to the reactor. In one embodiment by use of a polyene in combination with a chain transfer agent, more polyene, by mass, is added to reaction zone 1 as compared to the amount of polyene, by mass, added to reaction zone i. As used above, the amount of polyene is determined based on the polyene added to a reaction zone in a feed to the reactor. In one embodiment by use of a polyene in combination with a chain transfer agent, a greater concentration of polyene is added to reaction zone i as compared to the concentration of polyene added to reaction zone 1. In one embodiment by use of a polyene in combination with a chain transfer agent, a greater concentration of polyene is added to reaction zone 1 as compared to the concentration of polyene added to reaction zone i. In one embodiment by use of a polyene in combination with a chain transfer agent, polyene is added to both reaction zone 1 and reaction zone i.

In one embodiment, <20 wt %, or 5 wt %, or 1 wt %, or none, of the total amount of branching agent is fed to reaction zone 1. In one embodiment, <5 wt %, or 1 wt %, or 0.5 wt %, or none, of the total amount of polyene is fed to reaction zone 1. In one embodiment, <20 wt %, or 1 wt %, or 0.5 wt %, or none, of the total amount of make-up CTA is fed to reaction zone 1. In one embodiment by use of a mCTA in combination with a chain transfer agent, more mCTA, by- mass, is added to reaction zone 1 as compared to the amount of mCTA, by mass, added to reaction zone i. As used above, the amount of polyene is determined based on the polyene fed to a reaction zone. In one embodiment, by use of a mCTA in combination with a chain transfer agent, no mCTA, by mass, is added to the last reaction zone. In one embodiment, by use of a mCTA in combination with a chain transfer agent, no mCTA, by mass, is added to the last two reaction zones. In one embodiment, by use of a mCTA in combination with a chain transfer agent, all mCTA, by mass, is added to the first two reaction zones. In one embodiment, by use of a mCTA in combination with a chain transfer agent, all mCTA, by mass, is added to the first reaction zone. In one embodiment by use of a mCTA in combination with a chain transfer agent, all mCTA, by mass, is added to the second and third reaction zones. In one embodiment by use of a monomeric CTA in combination with a chain transfer agent and polyene, more mCTA, by mass, is added to reaction zone 1, as compared to the amount of mCTA, by mass, added to reaction zone i. In one embodiment by use of a mCTA in combination with a chain transfer agent and polyene, no mCTA, by mass, is added to the last reaction zones. In one embodiment by use of a mCTA in combination with a chain transfer agent and polyene, no mCTA, by mass, is added to the last two reaction zones. In one embodiment by use of a mCTA in combination with a chain transfer agent and polyene, all mCTA, by mass, is added to the first two reaction zones. In one embodiment by use of a mCTA in combination with a chain transfer agent and polyene, all mCTA, by mass, is added to the first reaction zone. In one embodiment by use of a mCTA in combination with a chain transfer agent and polyene, all mCTA, by mass, is added to the 2nd and 3rd reaction zones.

In one embodiment, prior to being fed into a reaction zone, the branching agent(s) are fed through a compression stage of a secondary compressor. The choice of feed point into the reaction and/or a reaction zone depends on several factors, including, but not limited to, the solubility of the branching agents in pressurized ethylene and/or solvent, the condensation of the branching agent(s) in pressurized ethylene, and/or the pre-heater fouling by premature polymerization of the branching(s).

In an embodiment, the concentration of polyene in the total ethylene feed to the reactor is <0.2, or <0.1, or <0.05, or <0.03 mole percent, based on the total moles of ethylene fed to the reactor. In an embodiment, the molar ratio of CTA versus polyene in the total ethylene feed to the reactor is preferably ≥1, or ≥2 or ≥4. In an embodiment, the molar ratio of CTA versus polyene in the total ethylene feed to the reactor is ≥2, or ≥4 or ≥6.

In one embodiment, the ethylene fed to the first reaction zone is at least 10 wt % of the total ethylene fed to the polymerization. In one embodiment, the ethylene fed to the first reaction zone is from 10 to 100, or from 20 to 80, or from 25 to 75, or from 30 to 70, or from 40 to 60 wt % of the total ethylene fed to the polymerization.

In one embodiment, the ethylene-based polymer comprises ethylene and one or more comonomers, and preferably one comonomer. Comonomers include α-olefins, acrylates, methacrylates and anhydrides, each typically having ≤20 carbon atoms. In one embodiment, the ethylene-based polymer comprises >90 wt %, further >92 wt %, further >93 wt %, further >95 wt %, further >98 wt %, further >99 wt % of polymerized ethylene, based on the weight of the polymer. In one embodiment the ethylene-based polymer is an ethylene homopolymer. In one embodiment, branching agent(s) are added prior to, or simultaneously with, the addition of free-radical initiator at the inlet of the reaction zone. Preferably, the BA(s) are added prior to the initiator addition to allow for a good dispersion of the BA(s).

A free radical initiator, as used here, refers to a free radical generated by chemical and/or radiation means. Exemplary free radical initiators include organic peroxides, including cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexan-oate, or mixtures thereof. In one embodiment, these organic peroxide initiators are used in an amount from 0.001 to 0.2 wt %, based upon the weight of polymerizable monomers. In one embodiment, an initiator is added to at least one reaction zone, and the initiator has a half-life temperature, at one second, >255° C., or >260° C. In a further embodiment, such initiators are used at a peak polymerization temperature from 320° C. to 350° C. In one embodiment, the initiator comprises at least one peroxide group incorporated in a ring structure. Examples include TRIGONOX™ 301 (3,6,9-triethyl-3,6,9-trimethyl-1,4,7-triperoxonaan) and TRIGONOX™ 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) from United Initiators. See also WO 02/14379 and WO 01/68723.

In one embodiment, for the polymerization process described herein, the maximum (or peak) temperature (max. temp.) for each reaction zone is from 150° C. to 360° C., or from 170° C. to 350° C., or from 200° C. to 340° C. In a further embodiment, the maximum temperature for each reaction zone, which is fed polyene, is from 260° C. to 330° C., or from 270° C. to 320° C., or from 280° C. to 310° C.

In one embodiment, the max. temp. in the first reaction zone is greater than (>) the max. temp. in each subsequent or consecutive reaction zone. In one embodiment, the max. temp. in the first reaction zone is ≥300° C., or ≥310° C., or ≥320° C. In one embodiment, the max. temp. in the first reaction zone is at least 10° C., or 20° C., or 30° C. greater than the max. temp. of each consecutive reaction zone. In one embodiment, the temperature of the first reaction zone is ≥320° C., or ≥330° C., or ≥340° C. In one embodiment, the temperature of the last reaction zone is ≤290° C., or ≤280° C., or ≤270° C. In one embodiment, the polymerization temperature difference between the first and last reaction zone is ≥30° C., or ≥40° C., or ≥50° C. In one embodiment, the difference in polymerization temperature between any two successive reaction zones, e.g., the difference between the first and second reaction zones, or the second and third reaction zones, etc., over the length of the reaction configuration is ≥10° C., or ≥20° C., or ≥30° C. In one embodiment, the polymerization temperature difference between each successive reaction zone, e.g., the difference between the first and second reaction zones, and the second and third reaction zones, etc., over the length of the reaction configuration is ≥10° C., or ≥20° C., or ≥30° C. In one embodiment, the ratio of the polymerization temperature of the first reaction zone (e.g., 320° C.) to the last, or $n^{th}$, reaction zone (e.g., 290° C.) is ≥1.1, or ≥1.2, or ≥1.3. In one embodiment, the max. temp. of the last reaction zone is less than (<) the max. temp. of each prior reaction zone.

In one embodiment, the polymerization pressure as measured at the first inlet of the reactor is from 1000 bar to 3600 bar, or from 1200 bar to 3500 bar, or from 1500 to 3400 bar, or from 2000 to 3200 bar. In one embodiment, the polyene is subject to an "oxygen removal step" prior to being fed to a reaction zone. In one embodiment, the polyene is stored in a feed vessel, and wherein the feed vessel has a "head-space gas" comprising <5.0 volume percent oxygen. A process for forming an ethylene-based polymer may comprise a combination of two or more embodiments as described herein. An inventive composition may comprise one or more additives, such as stabilizers (e.g., antioxidants), plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 wt % of the combined weight of one or more additives, based on the weight of the composition. An inventive composition may further comprise at least one other polymer, in addition to an inventive ethylene-based polymer.

Definitions

Unless stated to the contrary, implicit from the context, or customary in the art, all parts and percents are based on weight, and all test methods are current as of the filing date of this application. The term "composition," as used herein, includes a mixture of materials, which comprise the composition, as well as reaction products and decomposition products formed from the materials of the composition. The terms "blend" or "polymer blend," as used, refers to a mixture of two or more polymers. A blend may or may not be miscible (not phase separated at molecular level). A blend may or may not be phase separated.

The term "polymer" refers to a compound prepared by polymerizing monomers, whether of the same or a different type. The generic term polymer thus embraces the term homopolymer, and the term "interpolymer" as defined below. Trace amounts of impurities may be incorporated into and/or within the polymer. The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, at least one comonomer. The term "ethylene-based interpolymer" refers to an interpolymer that comprises a majority amount of polymerized ethylene, based on the weight of the interpolymer, and at least one comonomer. The term "ethylene-based copolymer" refers to a copolymer that comprises a majority amount of polymerized ethylene, based on the weight of the interpolymer, and a comonomer as the only monomer types.

The term "polyene," as used herein, refers to a poly-unsaturated compound having two or more carbon-carbon double bonds. The term "monomeric CTA," as used herein, refers to a poly-functional compound having one or more carbon-carbon double bonds and having one or more functional groups with elevated chain transfer activity (Cs value measured by Mortimer at 130° C. and 1360 atmospheres (137.8 MPa) is equal to, or greater than, 0.10. For example, such monomeric CTAs exclude C3-C20 unsaturated hydrocarbons).

The terms "rheology modifier" or "rheology modifying agent," as used herein, refer to the polyenes and/or mCTAs, as described herein, which are able to change the rheology of the polymer, for example, increase G' and melt strength, when incorporated into the polymer. The terms "branching agent", abbreviated as "BA", as used herein, refers to components able to form H- or T-branches in polymer, by which rheology of the polymer is modified, for example, increase of G'. Typical branching agents include symmetrical polyenes, asymmetrical polyenes and mCTAs.

The term "alkyl," as used herein, refers to a saturated linear, cyclic, or branched hydrocarbon group. Nonlimiting examples of suitable alkyl groups include, for example, methyl, ethyl, n-propyl, i-propyl, n-butyl, t-butyl, i-butyl (or 2-methylpropyl), etc. In one embodiment, the alkyls have 1 to 20 carbon atoms.

The term "high pressure polymerization process," as used herein, refers to a free radical polymerization process carried out at an elevated pressure of at least 1000 bar (100 MPa).

The terms "feed" or "feed stream," as used herein, refer to make-up and/or recycled component(s) added to a reaction zone at an inlet. A feed may consist of branching agent(s) or ethylene, comprise branching agent(s) or ethylene, or comprise branching agent(s) and ethylene. The terms "side stream" or "side feed stream," as used herein, refer to the ethylene-rich feed stream to sequential reaction zones.

The term "make-up," when used herein in reference to a component (i.e., "make-up ethylene," "make-up CTA," "make-up mCTA," "make-up polyene," etc.), refers to the feed stream of the reactant needed to compensate for the converted and/or lost component in the polymerization process.

The term "reaction zone," as used herein, refers to a reactor zone where the polymerization reaction is initiated or reinitiated by the addition of free radicals and/or components which dissociate into and/or generate free radicals. Typically, the reaction medium is heated and/or cooled by a heat transfer medium flowing through the jacket around the reactor. A reaction zone may also start with the addition of an ethylene feed and/or free radicals or components which dissociate into and/or generate free radicals. The term "first reaction zone," as used herein, refers to the first reactor zone where the polymerization is initiated by the addition of radicals or components which dissociate into and/or generate radicals. The first reaction zone ends at the point where there is a new feed of make-up and/or recycled ethylene, radicals, and/or components which dissociate into and/or generate radicals. The terms "subsequent reaction zone," or "sequential reaction zone," as used herein, refer to a reactor zone which receives ethylene and polymer from a previous reactor zone, and where radicals or components which dissociate into and/or generate radicals are added at the inlet of the subsequent (or sequential) reactor zone. The subsequent reaction zone ends at the point where there is a new feed of make-up and/or recycled ethylene, radicals, and/or components which dissociate into and/or generate radicals; however, the nth reaction zone ends at the position of a pressure control device of the reactor system. The number of subsequent (or sequential) reaction zones is (n−1), where n is the total number of reaction zones.

The terms "chain transfer constant" and "chain transfer coefficient (Cs value)" as used herein, refer to the ratio between the "rate of chain transfer" to the "rate of ethylene propagation." See Mortimer references provided in Experimental section. The terms "chain transfer activity" refers to the sum of molar concentration of each applied CTA component multiplied with its chain transfer constant (Cs). The chain transfer constant (Cs) is the ratio of reaction rates Ks/Kp, at a reference pressure (1360 atm, 137.8 MPa) and a reference temperature (130° C.).

The term "reactor configuration (or reactor system)," as used herein, refers to the components (devices) used to polymerize and isolate a polymer. Such components/devices include, but are not limited to, one or more reactors, a secondary compressor, a primary compressor, and a booster compressor.

The booster compressor (Booster) is a device that compresses the following: a) the low pressure recycle coming from the LPS (Low Pressure Separator), and b) optionally, the recycled compressor packing leaks, each to the pressure level required at the inlet side of the primary compressor. A Booster can consist of single or multiple compressor frames, and can be potentially combined with primary compressor frame(s). The primary compressor (Primary) is a device that compresses the following: a) the incoming ethylene, and/or b) the low pressure recycle coming from the Booster, and/or c) the recycled compressor packing leaks, each to the pressure level required to feed the inlet side of the hyper compressor. The Primary can consist of single or multiple compressor frames, and can be potentially combined with Booster compressor frame(s). Hyper compressor (Hyper), or secondary compressor, is a device that compresses the following: a) the ethylene coming from the HPR (High Pressure Recycle), and/or b) the Primary, each to a pressure level required to feed the reactor at its inlet pressure set point. The Hyper comprises a plunger reciprocating compressor, and can consist of single or multiple compressor frame(s). For these devices, each compression can he combined with intermediate cooling.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

Test Methods

Density—Samples for density measurement are prepared according to ASTM D 1928. Samples are pressed at 190° C. and 30,000 psi (206.8 MPa) for 3 minutes (min), and then at (21° C.) and 207 MPa for one minute. Measurements are made within 1 hour of sample pressing using ASTM D792, Method B.

Melt Index—Melt index, or I2, is measured in accordance by ASTM D 1238, Condition 190° C./2.16 kg, and is reported in grams eluted per 10 minutes (g/10 min).

Standard Method for Hexane Extractables—Polymer pellets (from the polymerization pelletization process, without further modification; approximately 2.2 grams per press) are pressed in a Carver Press at a thickness of 3.0-4.0 mils. The pellets are pressed at 190° C. for 3 minutes at 40,000 lb$_f$. Non-residue gloves (PIP* CleanTeam* CottonLisle Inspection Gloves, Part Number: 97-501) are worn to prevent contamination of the films with residual oils from the hands of the operator. Films are cut into 1-inch by 1-inch squares, and weighed (2.5±0.05 g). The films are extracted for two hours, in a hexane vessel, containing about 1000 ml of hexane, at 49.5±0.5° C., in a heated water bath. The hexane used is an isomeric "hexanes" mixture (for example, Hexanes (Optima), Fisher Chemical, high purity mobile phase for HPLC and/or extraction solvent for GC applications). After two hours, the films are removed, rinsed in clean hexane, and dried in a vacuum oven (80±5° C.) at full vacuum (ISOTEMP™ Vacuum Oven, Model 281A, at approximately 30 inches Hg) for 2 hours. The films are then place in desiccators, and allowed to cool to room temperature for a minimum of one hour. The films are then reweighed, and the amount of mass loss due to extraction in hexane is calculated. This method is based on 21 CRF 177.1520 (d)(3)(ii), with one deviation from FDA protocol—using hexanes instead of n-hexane.

Rheological G'—The sample is prepared from a compression molding plaque. A piece of aluminum foil is placed on a back plate, and a template or mold is placed on top of the back plate. Approx. 12 grams of resin is placed in the mold, and a second piece of aluminum foil is placed over the resin and mold. A second back plate is then placed on top of the aluminum foil. The total ensemble is put into a compression molding press, run at the following conditions: 3 min at 150° C. and 10 bar, followed by 1 min at 150° C. and 150 bar, followed by a 1.5 min quench cooling to room temperature at 150 bar. A 25 millimeter (mm) disk is stamped out of the compression-molded plaque. The thickness of the disk is approximately 2.0 mm. The rheology measurement to determine G' is done in a $N_2$ environment, at 170° C. and a strain of 10%. The stamped-out disk is placed between the two 25 mm parallel plates located in an ARES-1 (Rheometrics SC) rheometer oven, which is preheated for at least 30 minutes at 170° C., and the gap of the 25 mm parallel plates is slowly reduced to 1.65. mm. The sample is allowed to remain for exactly 5 min at these conditions. The oven is then opened, the excess sample is carefully trimmed around the edge of the plates, and the oven is closed. The storage modulus (G') and loss modulus (G") are measured via a small amplitude, oscillatory shear according to a decreasing frequency sweep form 100 to 0.1 rad/s (when able to obtain a G" value lower than 500 Pa at 0.1 rad/s), or from 100 to 0.01 rad/s. For each frequency sweep, 1-points (logarithmically spaced) per frequency decade are used. The data are plotted (G' (Y-axis) versus G" (X-axis)) on a log-log scale. The Y-axis scale covers the range from 10 to 1000 Pascals (Pa), while the X-axis scale covers the range from 100 to 1000 Pa. The Orchestrator software is used to select the data in the region where G" is between 200 and 800 Pa (or using at least 4 data points). The data are fit to a log polynomial model using the fit equation Y=C1+C2 ln(x). Using Orchestrator software, G' at G" equal to 500 Pa, is determined by interpolation. G' at G"=500 Pa is reported.

EXPERIMENTAL

Calculations for Z1, Z2 and Zi: The "reactor zone molar concentration of a CTA j in a reactor zone i ([CTA]ji)" is defined as the "total molar amount of that CTA injected to reactor zones 1 to i" divided by the "total molar amount of ethylene injected to reactor zones 1 to i." This relationship is shown below in Equation (Eqn) A $$[CTA]_{j_i} = \frac{\sum_{k=1}^{i} n_{CTA,j_k}}{\sum_{k=1}^{i} n_{eth_k}}. \quad \text{(Eqn A)}$$

In Eqn. A, $j \geq 1$, $n_{CTA,j}$, is the "amount of moles of the jth CTA injected to the ith reactor zone," and $n_{eth}$, is the "amount of moles of ethylene injected to the ith reactor zone." The "transfer activity of a CTA (system) in a reactor zone i" is defined as the "sum of the reactor zone molar concentration of each CTA in the reactor zone" multiplied with its chain transfer activity constant (Cs). The chain transfer activity constant (Cs) the ratio of reaction rates Ks/Kp, at a reference pressure (1360 atm, 137.8 MPa)) and a reference temperature (130° C.). This relationship is shown below in Eqn B, where $n_{comp}i$ is the total number of CTAs in reactor zone i, $$Z_i = \sum_{j_i=1}^{n_{comp,i}} [CTA]_{j_i} \cdot C_{s,j}. \quad \text{(Eqn B)}$$

Thus, the ratio Z1/Zi is shown below in Eqn C:

$$\frac{Z_1}{Z_i} = \frac{\sum_{j_1=1}^{n_{comp,1}} [CTA]_{j_1} \cdot C_{s,j}}{\sum_{j_i=1}^{n_{comp,i}} [CTA]_{j_i} \cdot C_{s,j}}. \quad \text{(Eqn C)}$$

Some chain transfer constants (Cs) are shown below in Table 1. (Cs) values were derived by Mortimer.

TABLE 1

| | (130° C. and 1360 atm) | | |
|---|---|---|---|
| | Cs (130° C., 1360 atm) | (0.8 − 0.2 * log(Cs)) | (0.75 − 0.2 * log(Cs)) |
| Methanol | 0.0021 | 1.34 | 1.29 |
| Propane | 0.00302 | 1.30 | 1.25 |
| Ethylacetate | 0.0045 | 1.27 | 1.22 |
| n-butane | 0.005 | 1.26 | 1.21 |
| Isobutane | 0.0072 | 1.23 | 1.18 |
| Ethanol | 0.0075 | 1.22 | 1.17 |
| Cyclohexane | 0.0095 | 1.20 | 1.15 |
| Propylene | 0.0122 | 1.18 | 1.13 |
| Isopropanol | 0.0144 | 1.17 | 1.12 |
| Acetone | 0.0168 | 1.15 | 1.10 |
| Butene-1 | 0.047 | 1.07 | 1.02 |
| MEK | 0.06 | 1.04 | 0.99 |

TABLE 1-continued

| | (130° C. and 1360 atm) | | |
|---|---|---|---|
| | Cs (130° C., 1360 atm) | (0.8 − 0.2 * log(Cs)) | (0.75 − 0.2 * log(Cs)) |
| PA | 0.33 | 0.90 | 0.85 |
| n-butanethiol | 5.8 | 0.65 | 0.60 |

In Table 1, the Cs-Values as Measured by Mortimer at 130° C. and 1360 atm in References 2, 3 and 4 and calculated boundary values for Z1/Zi ratio. The Cs value is for a CTA system containing only the noted CTA. Ref. No. 2. G. Mortimer; Journal of Polymer Science: Part A-1; Chain transfer in ethylene polymerization; vol 4, p 881-900 (1966). Ref. No. 3., G. Mortimer; Journal of Polymer Science: Part A-1; Chain transfer in ethylene polymerization. Part IV. Additional study at 1360 atm and 130° C.; vol 8, p1513-1523 (1970). Ref. No. 4. G. Mortimer; Journal of Polymer Science: Part A-I; Chain transfer in ethylene polymerization. Part VII. Very reactive and depleteable transfer agents; vol 10, p163-168 (1972). See also P. Ehrlich, G.A. Mortimer, Fundamentals of the free radical polymerization of ethylene, Adv. Polymer Sci., Vol 7, 386-448 (1970); G. Mortimer, Journal of Polymer Science: Part A-1, Chain transfer in ethylene polymerization. Part V. The effect of temperature; vol 8, p1535-1542 (1970); G. Mortimer, Journal of Polymer Science: Part A-1, Chain transfer in ethylene polymerization Part V. The effect of pressure, vol 8, p1543-1548 (1970).

When only one CTA is used in the total reactor system, Equations B and C simplify to Equations D and E, respectively. $Z_i = [CTA]_i \cdot C_s$ (Eqn D), $$\frac{Z_1}{Z_i} = \frac{[CTA]_1 \cdot C_s}{[CTA]_i \cdot C_s} = \frac{[CTA]_1}{[CTA]_i}. \quad \text{(Eqn E)}$$

For a multiple CTA-system an averaged Cs-value can be calculated with the following equation:

$$Cs(\text{averaged}) = \sum_{1}^{n} \frac{[CTA]_r * Cs.}{\sum_{1}^{n}([CTA]_r * Cs.)} * Cs_n. \quad \text{(Eqn F)}$$

Example Calculation: Propylene concentration=3400 mol-ppm; Cs-value of propylene =0.0122; PA conc.=1650 mol-ppm; Cs-value of PA=0.33; Cs(averaged)=[(3400 mol-ppm *0.0122*0.0122)+(1650 mol-ppm*0.33*0.33)]/(3400 mol-ppm*0.0122+1650 mol-ppm*0.33)=0.31.

Polymerization Simulations

A polymerization simulation model with applied reaction scheme and kinetics is described by Goto el al., see references below. Other reactor and product modeling frameworks are available through Aspen Plus of Aspen Technology, Inc., Burlington, Mass., USA; and PREDICI of Dr. Wulkow Computing in Technology GmbH (CiT), Rastede, Germany. Process and product responses predicted by these model frameworks are determined by the reactor parameters and the applied reaction scheme and kinetic parameters. The applied reaction scheme and kinetic parameters are described below. For each well-stirred autoclave reaction zone one calculation cell can be used. For each tubular reaction zone enough calculation cells are used to accurately represent the pressure, temperature and concentration profiles along the tubular reaction zone, such that the simulated product and process results, as reported in Tables 6-9, do not change with the addition of more cells. The polymerization simulations were achieved with Goto LDPE simulation model as described in the following: S. Goto et al; *Journal of Applied Polymer Science: Applied Polymer Symposium*, 36, 21-40, 1981 (Title: *Computer model for commercial high pressure polyethylene reactor based on elementary reaction rates obtained experimentally*). The kinetic data used by Goto et al. was derived from high pressure free radical polyethylene polymerization experiments performed at varying temperature, pressure and polymer concs. as described in the following: K. Yamamoto, M. Sugimoto; *Rate constant for long chain-chain branch formation in* free-radical polymerization of ethylene; *J. Macromol. Science-Chem.*, A13 (8), pp. 1067-1080 (1979). The following elementary reaction steps are described by Goto et al.: i) propagation of ethylene, ii) termination of radicals, iii) backbiting or short chain branching (SCB) formation, iv) transfer to polymer or long chain branching (LCB) formation, v) beta elimination of secondary radicals leading to vinyl formation, and vi) beta elimination of tertiary radicals leading to vinylidene formation. See Table 2 for kinetic data for main reactions, where ko is the pre-exponential or frequency factor; Ea is the activation energy, reflecting the temperature dependence; and $\Delta V$ is the activation volume, reflecting the pressure dependence. All kinetic constants are from Goto et al., except the ko, Ea and $\Delta V$ values for backbiting, which have been optimized to better reflect the level of methyl branches (as may be analyzed by C13 NMR technique) in high pressure polyethylene, as a function of pressure and temperature conditions.

TABLE 2

Kinetic Constants for Main Reactions

| Reaction | ko (m3/hr/kmol) | Ea (cal/mol) | $\Delta V$ (cc/mol) |
|---|---|---|---|
| Propagation | 5.63E+11 | 10520 | −19.7 |
| Termination | 3E+11 | 3000 | 13 |
| Backbiting | 2.6E+12 | 12130 | −14 |
| Transfer to Polymer | 1.75E+12 | 14080 | 4.4 |
| Beta Elimination of sec rad | 5.82E+11 | 15760 | −22.6 |
| Beta Elimination of tert rad | 8.51E+10 | 14530 | −19.7 |

The kinetic data for selected CTAs are given in Table 3. The kinetic constants have been calculated with the help of the kinetic constants on the Cs-value (ks/kp), as determined by Mortimer and the ethylene propagation kinetics as given by Goto et al. (see Table 1). The kinetic data for the selected mCTA is given in Table 3. The kinetics on "Chain transfer to Modifier" describes the CTA functionality, while the monomeric functionality is described by the "Reactivity Ratios." The polyenes have been described, and modeled, through assigning kinetic $r_1$ and $r_2$ reactivity ratios (see Tables 2 and 3). The kinetic $r_1$ and $r_2$ reactivity ratios are, by definition, linked to the ethylene propagation kinetics for their temperature (Ea) and pressure ($\Delta V$) dependencies. In the simulations, it was assumed that the polyenes do not exhibit additional chain transfer activity. Furthermore, for the total consumption, incorporation and T- and/or H-branch (inter- and intramolecular) formation, it has been assumed that, after incorporation of one functional group, the reactivity of the other functional group is not affected. In reality, the reactivity of the second functional group will be decreased after incorporation of the branching agent through its primary functional group in a polymer molecule. However, this assumption will not affect the second part of the study in Tables 6 and 7 (see IE1 to IE8). The first part of the study (CE12 to CE16), comprising actual polymerization results and simulations of these, focuses on the incorporation of the rheology modifier in the polymer, and the conversion to H-branches, in order to increase melt strength and G' values.

TABLE 3

Kinetic Constants for Selected CTA's and mCTA (Bifunctional Component)

| | Chain Transfer to Modifier | | | Reactivity Ratios | |
|---|---|---|---|---|---|
| Component | kao (m3/hr/kgmol) | Ea (cal/mol) | $\Delta V$ (cc/mol) | $r_1$ ($k_{11}/k_{12}$) | $r_2$ ($k_{22}/k_{21}$) |
| Propylene (CTA) | 2.20E+11 | 13220 | −16.7 | 3.10 | 0.77 |
| Propionaldehyde (CTA) | 1.07E+11 | 9720 | −8.4 | 0.00 | 0.00 |
| Acetone | 3.25E+11 | 13320 | −18.6 | 0.00 | 0.00 |
| Isobutane (CTA) | 3.51E+11 | 14020 | −16.7 | 0.00 | 0.00 |
| Monomeric CTA | 1.88E+11* | 10520* | −19.7* | 0.08** | 12.5** |

Note:
*Kinetic parameters to describe reactivity of the CTA group of the mCTA.
Note:
**Kinetic parameters to describe the reactivity of the monomeric group of the mCTA.

TABLE 4

Reactivity Ratios for Polyenes (Bifunctional Model Components)

| | | Reactivity Ratios | | |
|---|---|---|---|---|
| | | $r_{1B}/r_{1A}$ | $r_1$ ($k_{11}/k_{12}$) | $r_2$ ($k_{22}/k_{21}$) |
| BDMA | Bond A | 1 | 0.08 | 12.50 |
| | Bond B | | 0.08 | 12.50 |
| PPG-AEMA | Bond A | 1 | 0.08 | 12.50 |
| | Bond B | | 0.4 | 2.50 |

BDMA is 1,4-butanediol dimethacrylate, structure i.
PPG-AEMA is poly(propylene glycol) allyl ether methcrylate, structure h.

Short Chain Branching Prediction

Regarding SCBs, the backbiting mechanism generates mostly ethyl and butyl branches, while methyl branches are formed through copolymerization when propylene is used as a CTA to lower product density. A methyl branch has less impact on product density and extractability than an ethyl/butyl branch and, for calculation purposes, it has been assumed that the impact of a methyl branch is 75% of the impact of an ethyl/butyl branch on product density, leading to: $SCB_{frequency} = SCB_{by\ backbiting} + 0.75 * SCB_{by\ propylene}$.

Parameter for Modeling of Hexane Extractable Level

The extractability of polymer molecules in nonpolar solvents is influenced by polymer density (or in other words, by polymer melting point or SCB frequency), and molecular weight. A higher SCB level and lower molecular weight will promote extraction. In a tubular reactor, the polymer formed in the last reaction zone, at peak temp., will greatly contribute to and determine the final extractable level, since it typically has the highest level of SCB combined with a low chain length, due to lower degree of polymerization (DP, the propagation rate divided by the sum of all chain termination steps excluding LCB) and the higher degree of LCB. The probability of further growth of formed small molecules by the LCB mechanism is minimal by size of the molecules and low amount of remaining polymerization.

The chain segment length is calculated with the help of the following formula: Chain segment length (number of carbons) = $(1000 - 3*SCB_{freq})/(1000/DP + LCB_{freq})$ and reflects the average chain segment lengths of the polymer formed at the conditions leading to the SCB frequency, DP and LCB frequency values. Using the maximum SCB frequency and maximum LCB frequency in the last reaction zone, an average value for the minimum polymer chain segment length can be calculated. The minimum chain segment length listed in Table 9 shows the number of carbon atoms of the linear backbone. The length of an average SCB is assumed to be 3 carbon atoms, being the average of an ethyl and butyl branch. Methyl branches deriving from propylene as a CTA are treated after application of the 0.75 correction factor in a similar manner. The following is a representative calculation for the minimum chain segment length based on the values from Inventive Example 2: Minimum DP=494.6 ethylene units or 989.2 Carbon atoms; Maximum SCB frequency=36.86 per 1000 Carbon atoms (1000C); Maximum LCB frequency=10.46 per 1000C; Minimum Chain segment length=(1000−3*36.86)/(1000/989.2+10.46)=77.5 Carbon atoms.

Study 1—Comparative Actual Polymerization Examples (CE3-CE17)

In each flow scheme, FIGS. 1-8, in the Reactor, the polymerization is initiated with the help of free radical initiation systems, injected and/or activated at the inlet of each reaction zone. The maximum temperature in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11) which is sent for further separation to the low pressure separator (LPS). Ethylene stream (15) is cooled and liquids and/or solids are removed in stream (17). Stream (16) is a purge stream to remove impurities and/or inerts. The polymer separated in the LPS is further processed in (12). The ethylene removed (13) in the LPS is fed to the Booster, where, during the compression, condensables such as solvent, lubrication oil and others are collected and removed through stream (14). The outlet of the Booster is combined with make-up ethylene stream (1), and further compressed by the Primary compressors. In each reaction zone, pressurized water was used for cooling and/or heating the reaction medium, by circulating this water through the jacket of the reactor. The non-converted ethylene, and other gaseous components in the reactor outlet, were recycled through the high pressure recycle and low pressure recycle, and were compressed and distributed through the booster, primary and hyper (secondary) compressor systems.

Description of Flow Diagram used for Comparative Examples 3, 4, 5, 8 and 9

Figure 8:
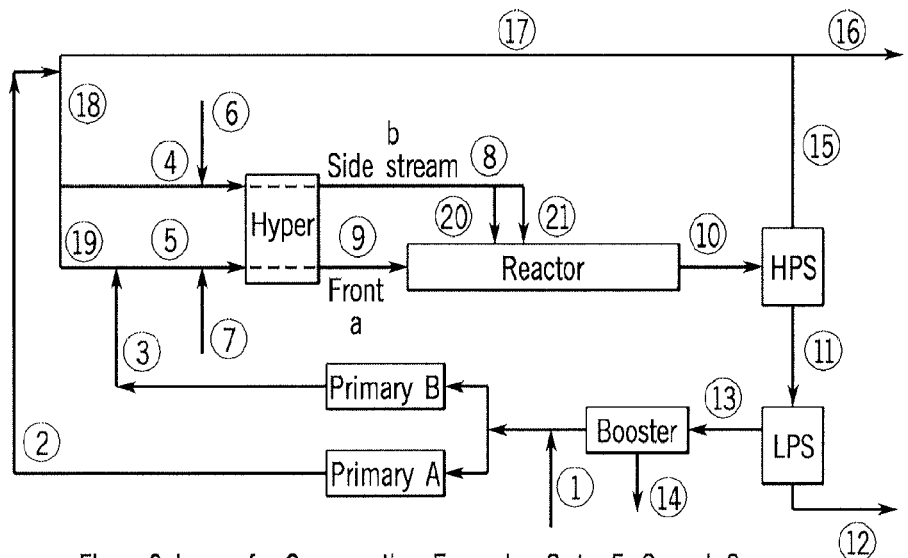
FIG. 8 is a flow diagram for Comp. Exs. 3 to 5, 8 and 9.

FIG. 8 shows the flow scheme of the polymerization process with a tubular reactor, used to produce Comp. Exs. 3, 4, 5, 8 and 9. Stream (1), ethylene make-up, is compressed together with the outlet of the Booster by Primary compressor B and A, resulting in stream (3) and (2). Stream (3) is fed together with additional ethylene from the high pressure recycle stream (19) through line (5) to the Hyper compressor part feeding the front (9) of the Reactor. Stream (2) is combined with the high pressure recycle stream (17) resulting in stream (18). The Hyper compressor part feeding the side stream (8) receives ethylene feed through line (18) and (4). The ethylene supplied by line (8) is distributed through line (20) and (21) to the side of the reactor. CTA is fed through Line (6) and Line (7). After finishing the reaction, and having applied multiple cooling steps, the reaction mixture is depressurized and/or cooled in (10), and separated as discussed above.

Description of Flow Diagram used for Comparative Examples 6, 10 to 13 and 16

Figure 6:
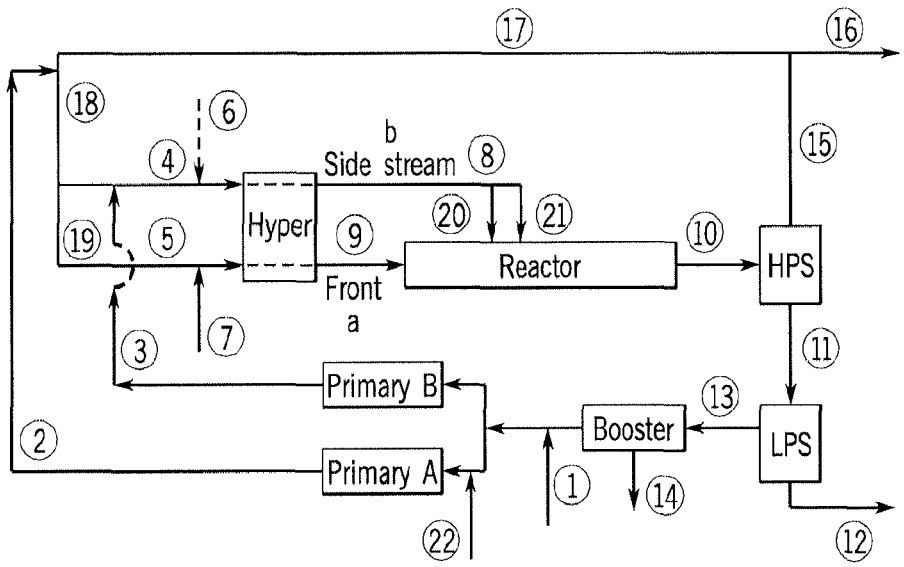
FIG. 6 is a flow diagram for Comp. Exs. 6, 10 to 13 and 16.

FIG. 6 shows the flow scheme of the high pressure polymerization process with a tubular reactor used to produce Comp. Exs. 6, 10 to 13, and 16. Stream (1), ethylene make-up, is compressed together with the outlet of the Booster by two parallel Primary compressors A+B, both have similar capacity, resulting in flow (2) and flow (3). CTA is added through (22) to the feed of Primary compressor A. Stream (2) is combined with high pressure recycle stream (18), and distributed over flow (4) and flow (19). The Hyper compressor part feeding the front (9) of the reactor, receives from line (18) ethylene feed through line (19) and line (5). The Hyper compressor part feeding the side stream (8) receives ethylene feed through line (4). The ethylene supplied by line (8) is distributed through line (20) and (21) to the side of the reactor. Line (4) receives ethylene feed from line (3) and additional ethylene from line (18). The Hyper pressurizes the ethylene feed streams to a level sufficient to feed the high pressure tubular reactor (Reactor). Stream (6) and/or stream (7) depict the polyene feed. After finishing the reaction, and having applied multiple cooling steps, the reaction mixture is depressurized and/or cooled in (10), and separated as discussed above.

Description of Flow Diagram used for Comparative Examples 7, 14 and 17 (Actual) and Inventive Examples 7 and 8 (Simulated)

Figure 7:
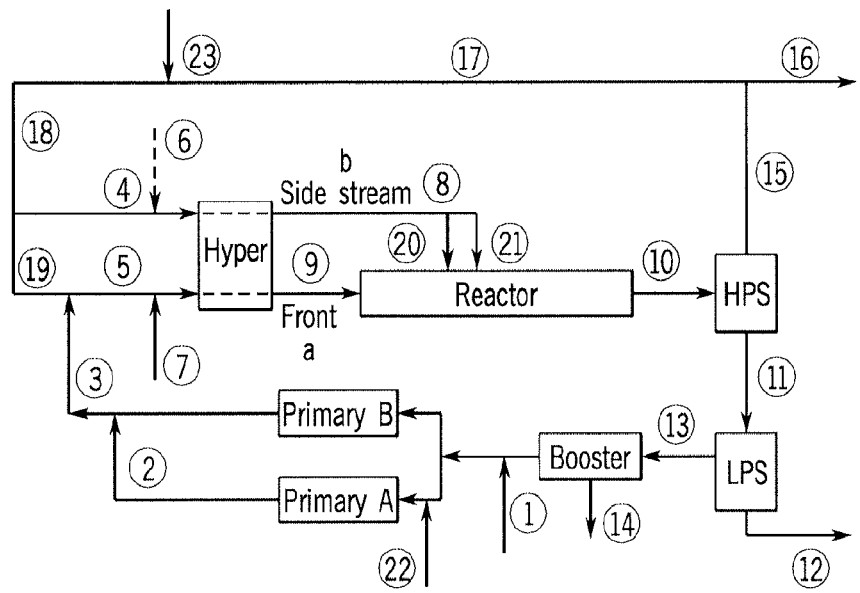
FIG. 7 is a flow diagram for Comp. Exs. 7, 14 and 17 and Inv. Exs. 7 and 8.

FIG. 7 shows the flow scheme of the high pressure polymerization with a tubular reactor, used to produce Comparative Examples 7, 14 and 17 (Actual) and Inventive Examples 7 and 8 (Simulated). Stream (1), ethylene make-up, is compressed together with the outlet of the Booster by Primary compressor system resulting in flow (3). Stream (3) is combined with high pressure recycle stream (19) and fed through line 5 to the Hyper compressor part feeding the front (9) of the Reactor. The Hyper compressor part feeding the side stream (8) receives ethylene feed through line (4). The ethylene supplied by line (8) is distributed through line (20) and (21) to the side of the reactor. Line (4) receives ethylene feed from line (18). The CTA is fed through line (22) and/or (23). The Hyper pressurizes the ethylene feed streams to a level sufficient to feed the high pressure tubular reactor (Reactor). Stream (6) and/or stream (7) depict the polyene feed. After finishing the reaction, and having applied multiple cooling steps, the reaction mixture is depressurized and/or cooled in (10), and separated as discussed above.

Description of Flow Diagram used for Comparative Example 15 (Actual)

Figure 5:
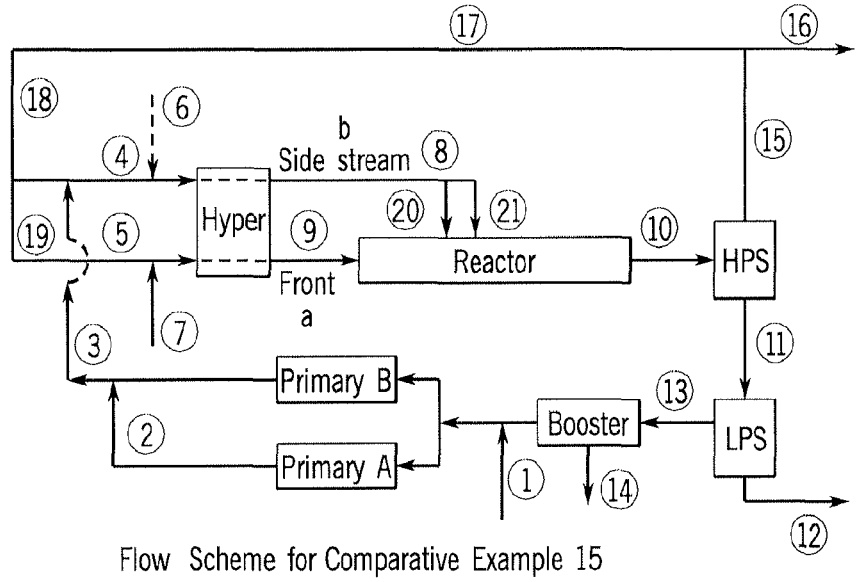
FIG. 5 is a flow diagram for Comp. Ex. 15.

FIG. 5 shows the flow scheme of the high pressure polymerization process (tubular) reactor, used to produce Comparative Example 15. Stream (1), ethylene make-up, is compressed together with the outlet of the Booster by Primary compressor system resulting in flow (3) and (2). Stream (3) is fed together with additional ethylene from the high pressure recycle stream (18) through line (4) to the Hyper compressor part feeding the side (8) of the Reactor. The ethylene supplied by line (8) is distributed through line (20) and (21) to the side of the reactor. The Hyper compressor part feeding the front stream (9) receives ethylene feed through line (19) and (5) from the high pressure recycle stream (18). Line (6) and Line (7) depict lines for feeding separately CTA and branching agent to respectively line (4) and line (5). After finishing the reaction, and applying multiple cooling steps, the reaction mixture is depressurized and/or cooled in (10), and separated as discussed above.

Comparative Examples 3-17 (Actual): The reaction zones in all comparative example polymerizations were initiated with peroxide systems described in Table 5, if not mentioned differently. The amount of peroxide system to each reaction zone was adjusted to reach peak control temperatures.

TABLE 5

Initiators

| Initiator | Abbreviation | Used in Rx-zone 1/2/3 |
|---|---|---|
| tert-Butyl peroxy-2-ethyl hexanoate | TBPO | yes/yes/no |
| Di-tert-butyl peroxide | DTBP | yes/yes/yes |

Description and Synthesis of Asymmetrical Diene Polypropylene glycol) Allyl Ether Methacrylate (PPG-AEMA) Used as Branching Agent in the Actual Polymerizations All methacrylate monomers in this application were prepared in accordance Example 1 in U.S. Pat. No. 4,916,255. In this case, XUS-13402.00, a polyglycol, commercially available from The Dow Chemical Company, was used to make the poly-(propylene glycol) allyl ether methacrylate. The kinetics of PPG-AEMA is given in Table 4. Simulation results on this polyene can be found in Table 6 to 9. The structure and additional properties for PPG-AEMA can be found below:

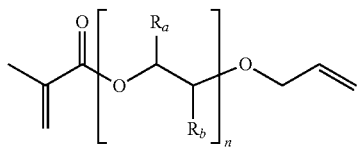

Mn of about 280 g/mole; n from about 1 to about 10; isomeric oligomeric mixture, for each n, $R_a$=H and $R_b$=CH3, and $R_a$=CH3 and $R_b$=H).

For the actual polymerizations, each polymerization was carried out in tubular reactor with three reaction zones. In each reaction zone, pressurized water was used for cooling and/or heating the reaction medium, by circulating this water through the jacket of the reactor. Organic peroxides (see Table 5) were fed into each reaction zone. In each reaction zone, pressurized water was used for cooling and/or heating the reaction medium, by circulating this water through the jacket of the reactor. Each reaction zone had one inlet and one outlet. Each inlet stream consisted of the outlet stream from the previous reaction zone and/or an added ethylene-rich feed stream. After reaching the first peak temperature in reaction zone 1, the reaction medium was cooled down with pressurized water. At the outlet of the first reaction zone, the reaction medium was further cooled by injecting a cold ethylene-rich feed stream (#20), and the reaction was initiated again, by feeding an organic peroxide system into the reaction zone. This process was repeated at the end of the second reaction zone, to enable further polymerization in the third reaction zone. The non-converted ethylene, and other gaseous components in the reactor outlet, were recycled through a high pressure recycle and a low pressure recycle, and were compressed and distributed through the booster, primary and hyper (secondary) compressor systems. The polymer was extruded and pelletized (about 30 pellets per gram), using a single screw extruder.

Comparative Examples 3-5 and 8-9 (Actual): The polymerization was carried out in tubular reactor with three reaction zones, according to the flow scheme shown in FIG. 9. The inlet-pressure was 2100 bar, and the pressure drop over the whole tubular reactor system was about 260 bars. Organic peroxides (Table 5) and were fed into each reaction zone. TRIGONOX™ 301 was added in reaction zone 1 and 2. Acetone was used as a chain transfer agent (CTA), and it was present in each reaction zone inlet, originating from the low pressure and high pressure recycle flows (#13 and #15), as well as from injected CTA make-up stream #6 and #7. The make-up ethylene is fed through stream #1. The polymer was extruded and pelletized (about 30 pellets per gram), using a single screw extruder system, at a melt temperature around 230-250° C. The weight ratio of the ethylene-rich feed streams to the three reaction zones was 1.00:0.76:0.24. The internal process velocity was approximately 12.5, 9 and 11 m/sec for respectively the $1^{st}$, $2^{nd}$ and $3^{rd}$ reaction zones. Additional information can be found in Tables 6 and 7. In Comp. Ex. 5, propylene was used as the CTA. The propylene was added to the suction of Primary A and not via stream 6 and 7. In Comp. Ex. 9, no TRIGONOX™ 301 was used, and propionaldehyde was the CTA. See also Tables 6-9.

Comparative Examples 6, 10-13 and 16 (Actual): The polymerization was carried out in tubular reactor with three reaction zones, according flow scheme shown in FIG. 7, The inlet-pressure was 2155 bar, and the pressure drop over the whole tubular reactor system was about 275 bars. Organic peroxides (see Table 5) were fed into each reaction zone. Propylene was used as a chain transfer agent (CTA), and it was present in each reaction zone inlet, originating from the low pressure and high pressure recycle flows (#13 and #15), as well as from injected CTA make-up stream #22. The make-up ethylene is fed through stream #1. The polymer was extruded and pelletized (about 30 pellets per gram), using a single screw extruder, at a melt temp. around 230-250° C. The weight ratio of the ethylene-rich feed streams to the three reaction zones was 1.00:0.80:0.20. The internal process velocity was approximately 12.5, 9 and 11 m/sec for respectively the $1^{st}$, $2^{nd}$ and $3^{rd}$ reaction zones. In Comp. Ex. 10, propionaldehyde was the CTA and added via stream #7. In Comp. Ex. 11, isobutane was the CTA. In Comp. Ex. 12, the rheology modifier PPG-AEMA was added via streams 6 and 7. In Comp. Ex. 13, the rheology modifier PPG-AEMA was added via stream 6. In Comp. Ex. 16, the rheology modifier PPG-AEMA was added via streams 6 and 7.

Comparative Example 7 (Actual): The polymerization was carried out in tubular reactor with three reaction zones. See FIG. 8. This configuration leads to the lowest ratios of CTA concentration in the front ethylene-based feed versus the concentrations of CTA in sequential ethylene-based feed streams. In each reaction zone, the polymerization was initiated with organic peroxides as described in Table 5. The weight ratio of the ethylene-rich feed streams to the three reaction zones was 1.00:0.60:0.40. Propionaldehyde (PA) was used as CTA, and it was present in each reactor inlet, originating from the low and high pressure recycle flows (#13 and #15), as well as from injected CTA make-up stream #23. The make-up ethylene is fed through stream #1. See also Tables 8 to 11. In Comp. Ex. 14, the rheology modifier PPG-AEMA was added via streams 6 and 7. In Comp. Ex. 17, propionaldehyde (CTA) was added via streams #6 and #7, and TRIGONOX™ 301 was used in reaction zones 1 and 2. See Tables 6-11.

Comparative Example 15 (Actual): The polymerization was carried out in tubular reactor with three reaction zones. See FIG. 6. This configuration leads to the highest ratios of CTA concentration in the front ethylene-based feed versus the concentrations of CTA in sequential ethylene-based feed streams. In each reaction zone, the polymerization was initiated with organic peroxides as described in Comp. Ex. 3. After reaching the first peak temperature in reaction zone 1, the reaction medium was cooled down with pressurized water. At the outlet of the first reaction zone, the reaction medium was further cooled by injecting a cold ethylene-rich feed stream, and the reaction was initiated again, by feeding an organic peroxide system into the reaction zone. This process was repeated at the end of the second reaction zone, to enable further polymerization in the third reaction zone. The weight ratio of the ethylene-rich feed streams to the three reaction zones was 1.00:0.60:0.40. For the chain transfer agent, PA, was used, and it was present in each reactor inlet, originating from the low and high pressure recycle flows (#13 and #15), as well as from injected CTA make-up stream #6 and #7. The make-up ethylene is fed through stream #1. The rheology modifier agent PPG-AEMA was added in stream #5 shortly after propionaldehyde was added via stream #7. See Tables 6 to 9.

Summary of Actual Polymerization Results: Comparative Examples 3-17 show the following. The results of the iso-butane as CTA, with reduced CTA-activity at the inlet of the reactor and/or in the first reaction zone, versus using propylene as the CTA, show the importance of reducing the CTA-activity at the inlet of the reactor and/or in the first reaction zone over the CTA-activity in subsequent reaction zones. Replacing iso-butane by propylene resulted in lower densities, higher extractable levels and less effective use of the rheology modifier, as shown by a higher consumption rate of the rheology modifier. Using PA (propionaldehyde), as the CTA, and increasing its concentration and activity to the subsequent reaction zones, led to an effective use (high G' value, and/or, in general, low consumption of the modifier) of the rheology modifier, and a product with a high G' value. In a few comparative examples PPG-AEMA was used to increase G' by forming intermolecular H-branches. The comparative examples were made at varying densities, melt indices, G' and hexane extractables. These comparative examples were used to derive correlations for G', density and hexane-extractables. The comparative examples, made at high G' and polymer densities be-tween 0.9190 and 0.9240 g/cc, show lower hexane-extractable-levels than similar examples at densities below 0.9190 g/cc. The inventive examples have even lower hexane-extractable levels.

Derivation of Correlation for Predicting G', Density and Hexane-Extractable: Empirical models are derived, valid for polymers of the type defined here, based on key outputs from the process simulations and based on measured polymer properties. The models are derived with linear regression using commercial software JMP®PRO version 11.1.1. Density is modeled with the following equation: Density [g/cc]=0.9498 −(0.000997*$SCB_{freq}$ [1/1000C])−(0.000529*$LCB_{freq}$[1/1000C])+(0.002587*log MI [dg/min]) Eqn. G. The density calculated by Eqn. G is representative of the actual measured density in the respective polymer sample. Based on the samples CE3-CE17, this model has a correlation coefficient $R^2$ of 0.959. The predicted density is given in Table 8 for all samples, including those samples where measured density is available. The G' (at G"=500 Pa, 170 C) is modeled with the following equation: G' (at G"=500 Pa, 170 C) ([Pa])=10^(1.9635−(0.2670*log MI [dg/min])+(0.07410*$LCB_{freq}$[1/1000C])−(0.1639*Z1/Zi)+(1.347*Simulated H-branch level [1/1000C])−(0.0224*log Cs)) Eqn. H. The G' value calculated by Eqn H is representative of the actual measured G' value in the respective polymer sample. Based on the samples CE3-CE17, this model (in the log G' form) has a correlation coefficient $R^2$ of 0.963. The predicted G'(at G"=500 Pa, 170 C) is given in Table 8 for all samples, including those samples where measured G' is available. The hexane extractable is modeled with the following equation: Hexane extractable [wt %]=0.38+(0.1488*Maximum $SCB_{freq}$ in last Rx-zone [1/1000C])−(0.0503*Minimum Chain segment length in last Rx-zone) (Eqn I). The hexane extractable level calculated by Equation I is representative of the actual measured hexane level in the respective polymer sample. Based on the samples CE3-CE17, this model has a correlation coefficient $R^2$ of 0.862. The predicted hexane extractable—see Table 9 for all samples, including those samples where measured hexane extractable is available. The model is based on simulation results in the last process zone. Apparent hexane extractable for each reactor zone i is provided by applying the same eqn. with the same inputs, but now selected in that same reactor zone i. Apparent Hexane extractable (zone k)=0.38+(0.1488*Maximum SCB level in Rx-zone k)−(0.0503*Minimum Chain segment length in Rx-zone k) (Eqn. J).

Study 2: Comparative and Inventive Examples (Simulated): Other than mentioned in the flow diagrams in FIGS. 1, 2, 3 and 4 described below, the polyene feed can optionally be freely distributed over the main compression streams fed to and/or distributed over the side streams (20) and/or (21) and/or front stream (9). Polyene streams (6) can be fed in the inlet(s), interstage(s), outlet(s) of the Hyper and/or directly into the reaction zones. Furthermore the polyene can be optionally dosed at the inlet, outlet or interstages of the Primary and/or Booster compressors systems.

Description of Flow Diagram used for Comparative Examples 1 and 2 (Simulated): The flow diagrams for Comp. Exs. 1 and 2 are described in patent application EP 2 681 250 B 1.

Description of Flow Diagram used for Inventive Examples 1 and 2 (Simulated): FIG. 1 shows the flow scheme of the high pressure polymerization process with a tubular reactor, used to produce Inv. Exs. 1 and 2. Stream (1), ethylene make-up, is compressed together with the outlet of the Booster by Primary compressor system resulting in flow (2). Stream (2) is fed, together with the ethylene, from the high pressure recycle stream (18) through lines (19), (5) and (4), to the Hyper compressor parts compressing respectively the front stream (9), and the sides streams (20) and (21) of the Reactor. Stream (6) depicts the polyene feed. The CTA is fed through line (7) to the Booster. Optionally the CTA can be fed to the inlet, interstages or outlet of the Primary or in line (18). Information about the Reactor system can be found Table 6. After finishing the reaction, and having applied multiple cooling steps, the reaction mixture is depressurized and/or cooled in (10), and separated as discussed above.

Figure 2:
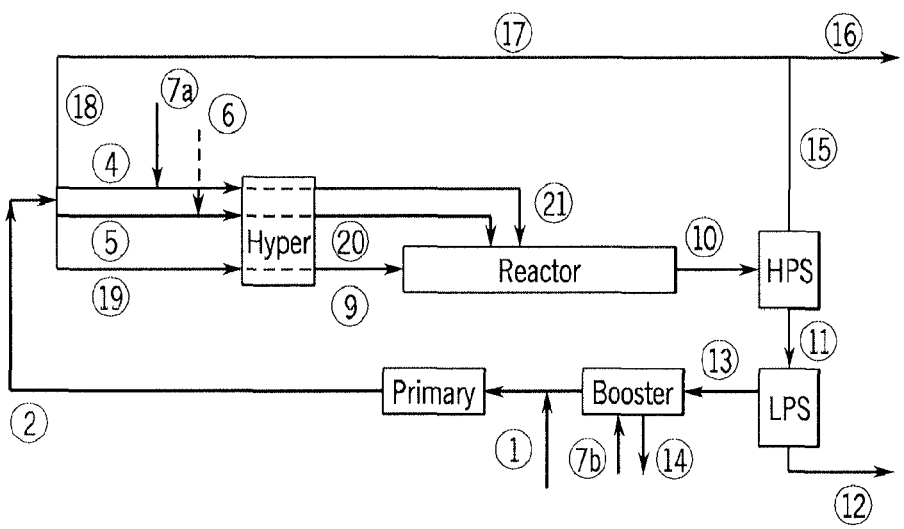
FIG. 2 is a flow diagram for Inv. Exs. 3 and 4.

Description of Flow Diagram used for Inventive Examples 3 and 4 (Simulated): FIG. 2 shows the flow scheme of the high pressure polymerization process with a tubular reactor, used to produce Inventive Examples 3 and 4. Stream (1), ethylene make-up, is compressed together with the outlet of the Booster by Primary compressor system resulting in flow (2). Stream (2) is fed together with additional ethylene from the high pressure recycle stream (18) through line (5) and line (19) to the Hyper compressor parts feeding respectively the side stream (20) and the stream (9) of the Reactor. The Hyper compressor part feeding the side stream (21) receives ethylene feed through line (4) from the high pressure recycle stream (18). The make-up CTA system can be fed through Line (7a) and Line (7b). The distribution of the make-up CTA over line (7a) and (7b) influences the CTA concentration in the reactor zones. Stream (6) depicts the polyene feed. After finishing the reaction, and having applied multiple cooling steps, the reaction mixture is depressurized and/or cooled in (10), and separated as discussed above.

Figure 3:
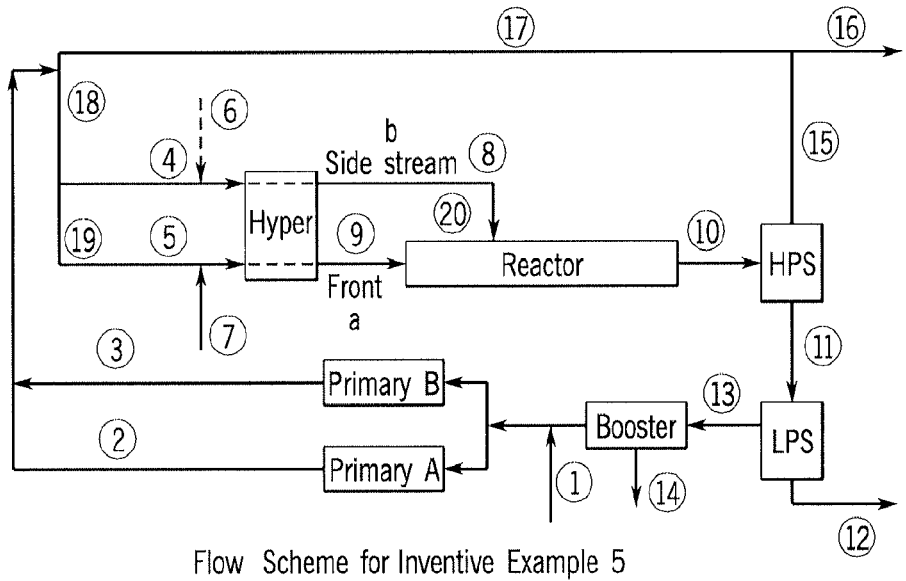
FIG. 3 is a flow diagram for Inv. Ex. 5.

Description of Flow Diagram used for Inventive Example 5 (Simulated): FIG. 3 shows the flow scheme of the high pressure polymerization process with a tubular reactor, used to produce Inventive Example 5. Stream (1), ethylene make-up, is compressed together with the outlet of the Booster by Primary compressor system resulting in flows (2) and (3). Stream (2) and (3) are combined with the high pressure recycle stream (18) and fed through line (19) and (5) to the Hyper compressor part feeding the front (9) of the Reactor. The Hyper compressor part feeding the side stream (8) receives ethylene feed through line (4). The ethylene supplied by line (8) is distributed through line (20) to the side of the reactor. Line (4) receives ethylene feed from line (18). The Hyper pressurizes the ethylene feed streams to a level sufficient to feed the high pressure tubular reactor (Reactor). Stream (6) and/or stream (7) depict the CTA feed. The polyene is fed in stream (4). After finishing the reaction, and having applied multiple cooling steps, the reaction mixture is depressurized and/or cooled in (10), and separated as discussed above.

Figure 4:
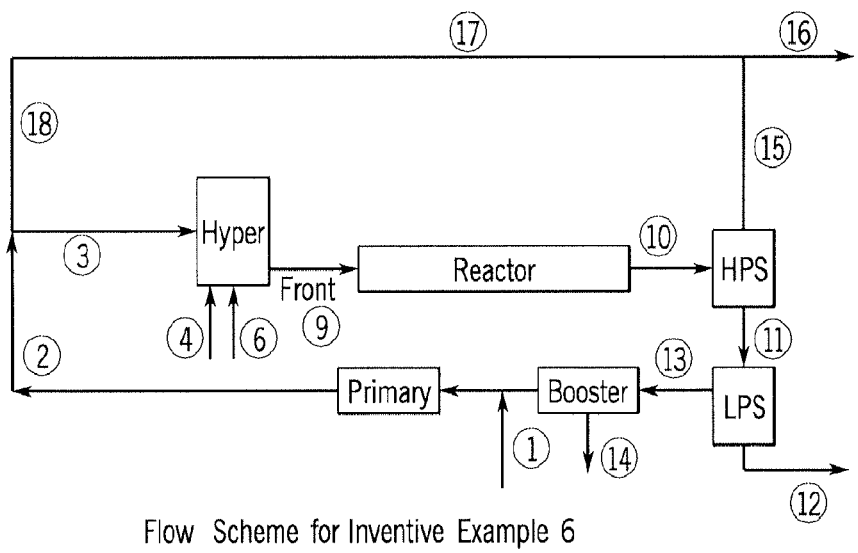
FIG. 4 is a flow diagram for Inv. Ex. 6.

Description of Flow Diagram used for Inventive Example 6 (Simulated): FIG. 4 shows the flow scheme of a simulated high pressure polymerization plant configuration containing a tubular reactor with an ethylene feed distribution of 100/0/0/0. Stream (1) is the ethylene make-up, which is compressed together with the outlet of the Booster by the Primary to stream (2). Stream (2) is combined with the high pressure recycle stream (18) and fed to the inlet of the "Hyper" via stream (3). The Hyper pressurizes the front ethylene feed stream (9) to a level sufficient to feed the high pressure tubular reactor (Reactor). Stream (4) depicts the CTA system make-up feed. CTA make-up streams (4) can be fed in the inlet(s), interstage(s), outlet(s) of the Hyper and/or inlet(s) of the reaction zones. Furthermore the CTA can be optionally dosed at the inlet, outlet or interstages of the Primary and/or Booster compressors systems. The CTA system can consist of single and/or multiple components and includes varying compositions. Stream (6) depicts the polyene feed. The discharge temperature of the Hyper is typically in the range of 60 to 100° C. The ethylene feed to the first reaction zone is typically preheated to a temp. in the range of 130 to 180° C., while the ethylene of the side feed is fed to the reactor at the Hyper discharge temperature or cooled prior to feeding to the reactor. The dimensions and configuration of the reactor are in Table 6. After finishing the reaction, and having applied multiple cooling steps, the reaction mixture is depressurized and/or cooled in (10), and separated as discussed above.

General Polymerization Conditions Used in Comparative Examples 1 and 2 and Inventive Examples 1-8 (Simulated): In all comparative and inventive polymerizations the CTA concentration has been adjusted to achieve a product with a melt index ($I_2$) described in Table 6. Variation in product melt-index is possible by lowering or increasing CTA concentration.

Reactor and Feed Configurations Used in Comp. and Inv. Example Polymerizations: Table 6 shows the reactor configuration (i.e., dimensions, lay-out, applied ethylene feed distribution) used for the simulated comparative and inventive polymerizations. The type and distribution of polyenes are shown in Table 8. The feed distributions show the percent of total ethylene or polyene feed stream fed to each reaction zone. The notation "100/0/0/0" means that all the total ethylene or polyene feed is fed to the first reaction zone, while no feed streams are fed to the second, third and fourth reaction zones. The ethylene or polyene received in the second, third and fourth reaction zones are carry-over from the previous reaction zones. Likewise, the notation "50/38/12" means that 50% of the total ethylene or polyene feed is fed to the first reaction zones, 38% of the total ethylene or polyene feed is fed to the second reaction zone and 12% of the total ethylene or polyene feed is fed to the third reaction zone. Further Table 6 give information on pressure level and initiation temperatures of all reaction zones, the ethylene feed temperature when a side ethylene feed stream is applied, and the maximum or peak temperatures in each reaction zone (Rx). The ethylene feed temperature can be optionally lowered and/or controlled with a cooler. The temperature of the cooling media is typically in the range of 0 to 220° C., while the temperature for preheating services is typically in the range of 100 to 250° C. The cooling/heating is applied through jackets around the high pressure tubes by co-current or counter-current flow. In the simulations the cooling/preheating was applied by counter-current and with one cooling section per reaction zone.

Comparative Examples 1 and 2: The polymerization simulations for Comp. Exs. 1 and 2 are based on Comp. Ex. A and Inv. Ex. 2 of the patent application EP 2 681 250 B1. As CTA, propionaldehyde was used. The reactor inlet pressure was 2800 bar. Comp. Ex. A is made in a tubular reactor with 4 reaction zones, and all reactants, except initiators, are fed to the front, resulting in an even CTA distribution, resulting in a product with high density and low hexane extractables and low G'-value. Inv. Ex. 2 is made with Z1/Zi ratio of 0, which gives a much higher G'-value. The Z1/Zi ratio of 0 is achieved by dividing the $1^{st}$ reaction of Comp. Ex. A in two. The first part is receiving only make-up ethylene containing no CTA. The second part is receiving the ethylene from the high-pressure and low pressure recycle also containing recycled CTA and the make-up flow of CTA. This results in a 5 reaction zone configuration that is able to produce polymer with high densities, high G' values and low extractables (see Tables 8 and 9).

Inventive Example 1 is made at the process conditions described in Tables 6 and 7 and according to FIG. 1. Propionaldehyde is used. To achieve an acceptable G'-level, a polyene is added in the 3rd reaction zone which gives H-branches. The initiator system was: Rx-zone 1 (TBPO/DTBP), Rx-zone 2 (TBPO/DTBP), Rx-zone 3 (TBPO/DTBP), Rx-zone 4 (DTBP), Rx-zone 5 (DTBP). See Tables 8 and 9.

Inventive Example 2 is made at the conditions described in Tables 6 and 7 and according to FIG. 1. As CTA, a mixture of propionaldehyde and propylene is used, resulting in a lower density compared to Inv. Ex. 1. To achieve an acceptable G'-level, a polyene is added in the 3rd reaction zone, which gives H-branches. The same initiator system can be used to achieve the simulated process conditions as in Inv. Ex. I. The predicted product properties are in Tables 8 and 9.

Inventive Example 3 is made with a monomeric CTA as a rheology modifier agent, instead of using a polyene, as in inv. Exs. 1 and 2. The kinetic-data is given in Table 4. Monomeric CTAs generates T-branches instead of H-branches. T-branches are less effective than H-branches. For the G'-prediction, they are treated as LCB. To achieve an acceptable G'-level, a higher T-branch-level is needed compared to a polyene. Due to the low reactivity of the CTA-functionality of the monomeric CTA, it is fed in the $2^{nd}$ reaction zone. This increases the conversion rate to T-branches compared to feeding in the 3$^{rd}$ reaction zone. The initiator system was: Rx-zone 1 (TBPO/DTBP/Tx-301), Rx-zone 2 (TBPO/DTBP), Rx-zone 3 (TBPO/DTBP), Rx-zone 4 (DTBP), Rx-zone 5 (DTBP). Tables 6-9.

Inventive Example 4 is made with a mixture of a monomeric CTA and a polyene. The kinetic-data is given in Table 4. As discussed above, monomeric CTAs generate T-branches instead of H-branches, which are less effective than H-branches. For the G'-prediction, they are treated as LCB. Due to the low reactivity of the CTA-functionality of the monomeric CTA, it is fed in the 2$^{nd}$ reaction zone. This increases the conversion rate to T-branches compared to feeding in the 3$^{rd}$ reaction zone. The polyene is fed in reaction zone 3. Due to the use of a polyene, less monomeric CTA is needed to obtain an acceptable G'-level. The same initiator system can be used as described in Inv. Ex. 3. Process and property information can be found in Tables 6-9.

Inventive Example 5 is made at the process conditions described in Tables 6 and 7, and according to FIG. 3. As CTA, propionaldehyde is used. To achieve an acceptable G'-level, a polyene is added in the 2$^{nd}$ reaction zone which gives H-branches. The initiator system is: Rx-zone 1 (TBPO/DTBP/Tx-301), Rx-zone 2 (TBPO/DTBP), Rx-zone 3 (DTBP), Rx-zone 4 (DTBP). See Tables 6-9.

Inventive Example 6 is made at the process conditions described in Tables 6 and 7, and according to FIG. 4. As CTA, propionaldehyde is used. To achieve an acceptable G'-level, a polyene is added in the 2$^{nd}$ reaction zone, which gives H-branches. The initiator system was: Rx-zone 1 (TBPO/DTBP/Tx-301), Rx-zone 2 (DTBP), Rx-zone 3 (DTBP), Rx-zone 4 (DTBP). See Tables 6-9.

Inventive Examples 7 and 8 are made at the conditions described in Tables 6 and 7, and according to FIG. 7. The two examples are made at almost the same process condition. To achieve an acceptable G'-level, a polyene is added in the 2$^{nd}$ reaction zone, which gives H-branches. The initiator system is: Rx-zone 1 (IBPO/DTBP/Tx-301), Rx-zone 2 (TBPO/DTBP), Rx-zone 3, Rx-zone 3 (DTBP).

Summary of Simulated Polymerization of Study 2: Comp. Ex. 1 shows a high density and low hexane extractable, but also a very low G' value. Comp. Ex. 2 has a good G'-value and hexane extractable level, but too high a density. A high G'-value is achieved using a rheology modifier of a polyene, a monomeric CTA or a mixture of both. The low hexane extractable-level is achieved, by applying low peak-temperatures in the last reaction zone(s). The desired densities are achieved by applying the correct combination of CTA-system, peak temperatures and reactor pressure. Comp. Exs. 3 to 17 are actual polymerizations, and are used to derive the correlations for density, G' and hexane extractables as described above. Table 10 lists tubular products together and some autoclave extrusion products. Autoclave resins have low hexane extractables due to the lower max. polymerization temps. These resins are very suitable for food contact and cook-in applications requiring a hexane extractable level requirement <2.6 wt % and a high melt strength. In autoclave reactors, typically, the ethylene conversion rate is <20%, which is significantly lower than that in a tubular reactor (typically >25%). The commercial tubular products with high G' value, and produced at lower densities, show extraction levels ranging from 3.4 to 4.1 wt %. Standard tubular products can be made at higher densities and low hexane extractable levels, but with low G'-values. Surprisingly, it has been found in Inv. Exs. 1 to 8, that tubular products with low hexane extractable levels and high G'-values can be made in the density range of 0.9190 to 0.9240 g/cc. More surprisingly, it has been found that these products with high G'-values can be made at hexane extractable levels≤autoclave products designed for the same high G' and product density.

TABLE 6

Reactor Configs, Feed Modes, Process and CTA Conds. for Comp. and Inv. Polyms.

| | Ethylene feed distribution % | # of Rx-zones | Inlet Press. Bar | Press. drop (ΔP) bar | MI dg/min | CTA | Cs at 1360 atm and 130° C. | CTA distr. Z1/Zi |
|---|---|---|---|---|---|---|---|---|
| CE3 to 17: tube i.d. (40/60/60 mm), Rx-zone length (distrib.): 1410 m (400/470/540 m); Thru-put about 55000 kg/hr ||||||||| 
| CE3 | 50/38/12 | 3 | 2100 | 261 | 3.5 | Acetone | 0.0168 | 0.86 |
| CE4 | 50/38/12 | 3 | 2100 | 260 | 5 | Acetone | 0.0168 | 0.86 |
| CE5 | 50/38/12 | 3 | 2100 | 754 | 5.2 | C3= | 0.0122 | 0.86 |
| CE6 | 50/40/10 | 3 | 2155 | 275 | 4.28 | C3= | 0.0122 | 1.14 |
| CE7 | 50/30/20 | 3 | 2140 | 264 | 4.14 | PA | 0.33 | 0.71 |
| CE8 | 50/38/12 | 3 | 2100 | 273 | 2 | Acetone | 0.0168 | 0.86 |
| CE9 | 50/34/16 | 3 | 2100 | 260 | 7.4 | PA | 0.33 | 0.92 |
| CE10 | 50/34/16 | 3 | 2100 | 260 | 7.1 | PA | 0.33 | 1.2 |
| CE11 | 50/40/10 | 3 | 2220 | 284 | 4 | isobutane | 0.0072 | 1.14 |
| CE12 | 50/40/10 | 3 | 2220 | 284 | 3.9 | isobutane | 0.0072 | 1.14 |
| CE13 | 50/40/10 | 3 | 2220 | 285 | 3.7 | isobutane | 0.0072 | 1.14 |
| CE14 | 50/30/20 | 3 | 2140 | 306 | 3.8 | PA | 0.33 | 0.71 |
| CE15 | 50/30/20 | 3 | 2140 | 279 | 3.8 | PA | 0.33 | 1.37 |
| CE16 | 50/40/10 | 3 | 2155 | 310 | 4.1 | C3= | 0.0122 | 1.14 |
| CE17 | 50/38/12 | 3 | 2078 | 295 | 0.75 | PA | 0.33 | 0.89 |
| CE1: tube i.d. 76 mm, Rx-zone length (distrib.): 2000 m (640/560/560/240 m) and Thru-put 117000 kg/hr |||||||||
| CE1 | 100/0/0/0 | 4 | 2800 | 356 | 5 | PA | 0.33 | 1 |
| CE2: tube i.d. 76 mm, Rx-zone length (distrib.): 2000 m (160/480/560/560/240 m) and Thru-put 117000 kg/hr |||||||||
| CE2 | 20/80/0/0/0 | 5 | 2800 | 324 | 2.7 | PA | 0.0122 | 0 |
| IE1 to 4: tube i.d. (35/50/60/60/60 mm). Rx-zone length (distrib.): 1800 m (200/300/500/400/400 m); Thru-put 60000 kg/hr |||||||||
| IE1 | 25/25/50/0/0 | 5 | 2400 | 358 | 4 | PA | 0.33 | 1 |
| IE2 | 25/25/50/0/0 | 5 | 2300 | 372 | 4 | C3=/PA | 0.07 | 1 |

TABLE 6-continued

Reactor Configs, Feed Modes, Process and CTA Conds. for Comp. and Inv. Polyms.

| | Ethylene feed distribution % | # of Rx-zones | Inlet Press. Bar | Press. drop (ΔP) bar | MI dg/min | CTA | Cs at 1360 atm and 130° C. | CTA distr. Z1/Zi |
|---|---|---|---|---|---|---|---|---|
| IE3 | 25/25/50/0/0 | 5 | 2400 | | 4 | PA | 0.33 | 0.67 |
| IE4 | 25/25/50/0/0 | 5 | 2400 | 367 | 4 | PA | 0.33 | 0.67 |
| | IE5: tube i.d. (50/60/60/60 mm), Rx-zone length (distrib.): 1500 m (300/400/400/400 m) and Thru-put 60000 kg/hr | | | | | | | |
| IE5 | 65/35/0/0 | 4 | 2400 | 317 | 4 | PA | 0.33 | 1 |
| | IE6: tube i.d. 54 mm. Rx-zone length (distrib.): 1500 m (450/350/400/300 m) and Thru-put 60000 kg/hr | | | | | | | |
| IE6 | 100/0/0/0 | 4 | 2500 | 499 | 4 | PA | 0.33 | 1 |
| | IE 7 and 8: tube i.d. (40/60/60 mm), Rx-zone length (distrib.): 1410 m (400/470/540 m) and Thru-put about 55000 kg/hr | | | | | | | |
| IE7 | 50/30/20 | 3 | 2300 | 240 | 4 | PA | 0.33 | 0.71 |
| IE8 | 50/30/20 | 3 | 2300 | 260 | 10 | C3=/PA | 0.31 | 0.71 |

Note:
C3= is propylene. CE3-CE17 are actual comparative polymerizations. CE1-CE2 and IE1-IE8 are simulated comparative and inventive polymerizations, respectively.

TABLE 7

Reactor Temps., Actual Conversions and Simulated Conversions and Polymer Branching Levels

| | Peak temps° C. | (Re)initiation temps° C. | Side stream(s) temp ° C. | Ethylene conv measured % | Ethylene conv simulated % | Simul. LCB #/1000 C | Simul. SCB #/1000 C |
|---|---|---|---|---|---|---|---|
| CE3 | 330/321/310 | 140/154/233 | 61 | 31.8 | 32.3 | 5.33 | 28.7 |
| CE4 | 337/330/310 | 140/157/244 | 62 | 32.4 | 33.2 | 5.72 | 29.3 |
| CE5 | 330/319/306 | 140/151/231 | 62 | 31.8 | 32.2 | 5.23 | 31.4 |
| CE6 | 293/293/294 | 146/148/220 | 68 | 28.2 | 28.0 | 3.67 | 29.5 |
| CE7 | 292/294/294 | 145/159/197 | 56 | 28.4 | 28.4 | 3.74 | 25.5 |
| CE8 | 331/326/311 | 140/154/238 | 62 | 33.4 | 32.4 | 5.47 | 28.9 |
| CE9 | 325/319/296 | 140/149/209 | 62 | 30.4 | 37.2 | 4.97 | 27.6 |
| CE10 | 324/318/294 | 140/147/209 | 62 | 32.1 | 32.1 | 4.9 | 27.6 |
| CE11 | 293/293/293 | 145/152/196 | 60 | 27.7 | 27.5 | 3.74 | 26.5 |
| CE12 | 293/293/293 | 144/148/211 | 60 | 27.5 | 27.4 | 3.62 | 25.7 |
| CE13 | 294/293/294 | 140/148/213 | 59 | 27.5 | 27.6 | 3.66 | 25.8 |
| CE14 | 293/293/293 | 145/160/199 | 56 | 28.3 | 28 | 3.64 | 25.1 |
| CE15 | 293/293/293 | 145/151/198 | 56 | 28.2 | 28.1 | 3.56 | 24.8 |
| CE16 | 293/293/294 | 145/148/217 | 65 | 27.5 | 28.3 | 3.68 | 30.5 |
| CE17 | 331/326/300 | 140/160/248 | 58 | 29.7 | 30 | 5.03 | 28.5 |
| CE1 | 307/307/301/301 | 157/247/252/260 | none | 29.9 | 30.5 | 3.25 | 24.1 |
| CE2 | 307/278/300/300/300 | 157/196/243/247/256 | 157 | 28.3 | 28.2 | 2.83 | 23.3 |
| IE1 | 320/320/295/290/277 | 150/169/192/251/256 | 80 | | 33.8 | 4.5 | 26.0 |
| IE2 | 315/315/300/295/280 | 150/169/213/259/250 | 80 | | 33.7 | 4.42 | 28.4 |
| IE3 | 335/305/305/294/278 | 150/163/174/261/259 | 60 | | 34.7 | 4.65 | 26.2 |
| IE4 | 335/310/300/294/277 | 150/163/174/259/259 | 60 | | 34.1 | 4.61 | 26.1 |
| IE5 | 330/300/300/280 | 150/169/213/259/251 | 80 | | 33.4 | 4.3 | 26.2 |
| IE6 | 330/320/300/277 | 140/269/269/256 | 80 | | 33.8 | 4.45 | 26.8 |
| IE7 | 335/305/287 | 140/167/205 | 56 | | 29.8 | 4.09 | 26 |
| IE8 | 335/305/284 | 140/164/201 | 56 | | 30.1 | 4.08 | 26.9 |

TABLE 8

Branching agent conditions and measured and predicted density and G' for polymers

| | RM agent | RMA Distribution wt % | Simulated H- or (T-) Branch #/1000 C | Density measured g/cc | Density predicted Eqn. G a/cc | G' meas. Pa | G' predicted Eqn. H Pa | G' limit Eqn in claim 1 Pa |
|---|---|---|---|---|---|---|---|---|
| CE3 | none | none | 0.0 | 0.9196 | 0.9198 | 126 | 129 | 123 |
| CE4 | none | none | 0.0 | 0.9188 | 0.9194 | 132 | 126 | 115 |
| CE5 | none | none | 0.0 | 0.9177 | 0.9176 | 113 | 115 | 114 |
| CE6 | none | none | 0.0 | 0.9195 | 0.9201 | 79 | 83.7 | 118 |
| CE7 | none | none | 0.0 | 0.9246 | 0.924 | 99 | 93.4 | 119 |
| CE8 | none | none | 0.0 | 0.9193 | 0.9189 | 153 | 154 | 135 |
| CE9 | none | none | 0.0 | 0.9220 | 0.9219 | 89 | 91.2 | 107 |
| CE10 | none | none | 0.0 | 0.9221 | 0.9219 | 83 | 81.9 | 107 |
| CE11 | none | none | 0.0 | 0.9235 | 0.923 | 89 | 87.3 | 120 |
| CE12 | PPG-AEMA | 62/30/8 | 0.117 | 0.9229 | 0.9238 | 137 | 124 | 120 |

TABLE 8-continued

Branching agent conditions and measured and predicted density and G' for polymers

| | RM agent | RMA Distribution wt % | Simulated H- or (T-) Branch #/1000 C | Density measured g/cc | Density predicted Eqn. G a/cc | G' meas. Pa | G' predicted Eqn. H Pa | G' limit Eqn in claim 1 Pa |
|---|---|---|---|---|---|---|---|---|
| CE13 | PPG-AEMA | 0/80/20 | 0.085 | 0.9234 | 0.9236 | 112 | 114 | 122 |
| CE14 | PPG-AEMA | 13/52/35 | 0.097 | 0.9251 | 0.9243 | 177 | 127 | 121 |
| CE15 | PPG-AEMA | 100/0/0 | 0.137 | 0.9240 | 0.9247 | 111 | 111 | 121 |
| CE16 | PPG-AEMA | 65/29/7 | 0.138 | 0.9194 | 0.919 | 124 | 130 | 119 |
| CE17 | none | none | 0.0 | 0.9183 | 0.9184 | 172 | 172 | 156 |
| CE1 | none | none | 0 | | 0.9259 | | 73.2 | 115 |
| CE2 | none | none | 0.0 | | 0.9262 | | 126 | 128 |
| IE1 | Polyene | 0/0/100/0/0 | 0.08 | | 0.923 | | 123 | 120 |
| IE2 | Polyene | 0/0/100/0/0 | 0.08 | | 0.9207 | | 126 | 120 |
| IE3 | Monom. CTA | 0/100/0/0/0 | (0.8)[1] | | 0.9223 | | 128 | 120 |
| IE4 | (Monomeric CTA) Polyene | (0/100/0/0/0) 0/0/100/0/0 | 0.04 (0.4)[1] | | 0.9227 | | 135 | 120 |
| IE5 | Polyene | 0/0/100/0/0 | 0.10 | | 0.923 | | 127 | 120 |
| IE6 | Polyene | 0/0/100/0/0 | 0.08 | | 0.9273 | | 122 | 120 |
| IE7 | Polyene | 0/100/0/0 | 0.08 | | 0.9233 | | 128 | 120 |
| IE8 | Polyene | 0/100/0/0 | 0.10 | | 0.9234 | | 107 | 100 |

Note 1:
In case of T-branching, the LCB simulation is augmented by the value in brackets in the G' and density model prediction

TABLE 9*

| | Max. SCB freq inRX-zone (i-2)/(i-1)/(i)#1000 C | Min. CSL level in RX-zone (i-2)/(i-1)/(i)#1000 C | Hexane extr. Meas. wt % | Apparent in (i-2) Rx-zone Eqn Jwt % | Apparent in (i-1) Rx-zone Eqn Jwt % | Predicted from $i^{th}$ Rx-zone Eqn Iwt % | Hex Ext. Eqn 1 wt % |
|---|---|---|---|---|---|---|---|
| CE3 | 34.2/37.7/38.9 | 129.1/78.9/62.2 | 3 | <0.5 | 2.03 | 3.05 | 2.29 |
| CE4 | 36.2/39.3/39.3 | 117.6/70.1/60.0 | 3.8 | <0.5 | 2.71 | 3.22 | 2.44 |
| CE5 | 38.1/41.0/42.1 | 125.2/78.0/62.8 | 3.5 | <0.5 | 2.56 | 3.49 | 2.93 |
| CE6 | 34.2/36.5/39.3 | 199.7/120.6/83.9 | 2.1 | <0.5 | <0.5 | 2.01 | 2.23 |
| CE7 | 28.9/32.3/34.9 | 224.6/121.3/84.7 | 1.3 | <0.5 | <0.5 | 1.32 | 1.17 |
| CE8 | 35.2/38.5/39 | 129.2/75.1/62.1 | 3 | <0.5 | 2.34 | 3.07 | 2.47 |
| CE9 | 34.2/37.4/36.7 | 136.9/78.4/69.3 | 1.9 | <0.5 | 2.01 | 2.36 | 1.80 |
| CE10 | 34.2/37.2/36.5 | 136.6/79.4/70.6 | 1.8 | <0.5 | 1.93 | 2.27 | 1.80 |
| CE11 | 30.4/32.4/36.3 | 197.1/129.2/83.1 | 1.4 | <0.5 | <0.5 | 1.61 | 1.44 |
| CE12 | 30.3/32.7/36.3 | 203.5/127.7/84.0 | 1.7 | <0.5 | <0.5 | 1.56 | 1.22 |
| CE13 | 30.5/32.7/36.5 | 197.2/127.1/82.3 | 1.5 | <0.5 | <0.5 | 1.68 | 1.27 |
| CE14 | 28.7/31.3/33.9 | 222.1/128.6/89.2 | 1.3 | <0.5 | <0.5 | 0.94 | 1.08 |
| CE15 | 28.6/31.2/33.4 | 214.4/128.8/92.1 | NA | <0.5 | <0.5 | 0.72 | 0.98 |
| CE16 | 35.5/37.7/40.6 | 200.9/120.3/82.8 | 2.1 | <0.5 | <0.5 | 2.26 | 2.52 |
| CE17 | 35.3/38.5/36.5 | 128.3/76.0/75.3 | 2.5 | <0.5 | 2.29 | 2.03 | 2.50 |
| CE1 | 28.7/30.4/33.1 | 160.8/117.6/85.8 | | <0.5 | <0.5 | 1 | 0.68 |
| CE2 | 26.6/28.7/31 | 209/144.7/105.8 | | <0.5 | <0.5 | <0.5 | 0.53 |
| IE1 | 30.8/32.5/32.8 | 122.6/93.1/83.5 | | <0.5 | 0.54 | 1.07 | 1.44 |
| IE2 | 34.8/36.7/36.9 | 114.7/86.2/77.5 | | <0.5 | 1.51 | 1.98 | 2.06 |
| IE3 | 32.5/33.4/33.1 | 106.1/86.7/81.2 | | <0.5 | 1 | 1.23 | 1.63 |
| IE4 | 31.8/33.3/33 | 111.1/87.7/81.7 | | <0.5 | 0.93 | 1.19 | 1.52 |
| IE5 | 30.7/33.2/32.6 | 129.2/91.2/85.5 | | <0.5 | 0.74 | 0.94 | 1.44 |
| IE6 | 33.5/33.6/33 | 102.7/87.3/82.1 | | <0.5 | 1 | 1.17 | 1.63 |
| IE7 | 33.8/33.5/33.2 | 134.5/100.5/90.5 | | <0.5 | <0.5 | 0.77 | 1.36 |
| IE8 | 34.6/34.8/34.4 | 131.9/97.5/89.1 | | <0.5 | 0.66 | 1.02 | 1.43 |

*Simulated Maximum Short Chain Branching Levels and Minimum Chain Segment Lengths in Last Three Reaction Zones and Measured/Apparent/Predicted Hexane Extractable Levels for Comp. and Inv. Polymerizations.

TABLE 10

Comparative extrusion coating resins

| | | MI dg/min | Density g/cc | G'(G' = 500 Pa; 170° C.) Pa | Hexane Extr. wt % | Density g/cc* | G' (G' = 500 Pa: 170 C.) Pa* | Hexane Extr. wt %* |
|---|---|---|---|---|---|---|---|---|
| Borealis CT7200 | Tube | 4.7 | 0.9189 | 128 | 4.1 | 0.9190-0.9240 | 110 | 2.0 |
| Dow Agility EC7000 | Tube | 3.9 | 0.9188 | 140 | 3.4 | 0.9190-0.9240 | 115 | 2.0 |
| Dow PG7004 | AC | 4.1 | 0.9215 | 146 | 1.4 | 0.9190-0.9240 | 113 | 1.9 |
| Dow LD410E | Tube | 2.0 | 0.9242 | 89* | 1.1 to 1.3 | 0.9190-0.9240 | 132 | 1.0 |

TABLE 10-continued

Comparative extrusion coating resins

|  |  | MI dg/min | Density g/cc | G'(G' = 500 Pa; 170° C.) Pa | Hexane Extr. wt % | Density g/cc* | G' (G' = 500 Pa: 170 C.) Pa* | Hexane Extr. wt %* |
|---|---|---|---|---|---|---|---|---|
| Dow LD450E | Tube | 2.0 | 0.9231 | 113* | 1.0 to 1.4 | 0.9190-0.9240 | 132 | 1.3 |
| Dow 5004I | AC | 4.1 | 0.9234 | 129 | 1.4 | 0.9190-0.9240 | 113 | 1.3 |

*Claim boundaries,
**170° C. data is interpolated from 150° C. and 190° C. data.

What is claimed is:

1. A process producing an ethylene-based polymer, the process comprising contacting in a reaction configuration, comprising a first tubular reaction zone 1 and a last tubular reaction zone i, in which i is greater than or equal to 3, under high pressure polymerization conditions, and in which the first reaction zone 1 has a peak polymerization temperature greater than the peak temperature of the ith reaction zone, and wherein the difference in these two peak temperatures is greater than or equal to 30° C.: and forming an ethylene-base polymer having the following properties:

(A) a density from 0.9190 g/cc to 0.9240 g/cc;

(B) a hexane extractable level that is less than or equal to the lower of:

(1) (A+(B*density (g/cc))+(C*log(MI) dg/min)) based on total weight of the ethylene-base polymer; where A=250.5 wt %, B=−270 wt %/(g/cc), C=0.25 wt %/[log(dg/min)], or (2) 2.0 wt %;

(C) a G' (at G"=500 Pa, 170° C.) that meets the following equation: G'≥D+E[log (12)], where D=150 Pa and E=−60 Pa/[log(dg/min)]; and (D) a melt index (12) from 1.0 to 20 dg/min.

2. The process of claim 1, wherein i is greater than or equal to ≥4.

3. The process of claim 1, wherein a branching agent is added to at least one reaction zone.

4. The process of claim 3, wherein the branching agent is one or more polyenes.

5. The process of claim 3 wherein the branching agent is one or more monomeric CIA.

6. The process of claim 3 wherein the branching agent is a mixture of monomeric CTA and polyene.

7. The process of claim 1 comprising an ethylene-based polymer having greater than 93 wt % ethylene based on the weight of the polymer.

8. The process of claim 1 comprising forming an ethylene-based polymer having a density from 0.9195 g/cc to 0.9235 g/cc.

9. The process of claim 1 comprising forming an ethylene-based polymer having a density from 0.9200 g/cc to 0.9230 /cc.

* * * * *